(12) United States Patent
Guo et al.

(10) Patent No.: US 10,482,604 B2
(45) Date of Patent: Nov. 19, 2019

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Yanen Guo, Shanghai (CN); Jianhua Shen, Shanghai (CN); Xiaodong Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 36 days.

(21) Appl. No.: 15/710,815

(22) Filed: Sep. 20, 2017

(65) Prior Publication Data

US 2018/0322635 A1 Nov. 8, 2018

(30) Foreign Application Priority Data

May 5, 2017 (CN) .......................... 2017 1 0311691
May 5, 2017 (CN) .......................... 2017 1 0311908

(Continued)

(51) Int. Cl.
*G06T 7/12* (2017.01)
*G06T 7/149* (2017.01)

(52) U.S. Cl.
CPC .............. *G06T 7/12* (2017.01); *G06T 7/149* (2017.01); *G06T 2207/10072* (2013.01);
(Continued)

(58) Field of Classification Search
CPC ....... G06T 7/0012; G06T 7/0014; G06T 7/10; G06T 7/11; G06T 7/12; G06T 7/149;
(Continued)

(56) References Cited

U.S. PATENT DOCUMENTS

2008/0181481 A1* 7/2008 Hong et al. ............... G06T 7/12
382/132
2014/0294276 A1* 10/2014 Song et al. ............... G06T 7/75
382/132

(Continued)

FOREIGN PATENT DOCUMENTS

| CN | 103310449 A | 9/2013 |
| CN | 105719278 A | 6/2016 |
| CN | 105976384 A | 9/2016 |

OTHER PUBLICATIONS

Olivier Ecabert, et al., Automatic Model-Based Segmentation of the Heart in CT Images:IEEE Transactions on Medical Imaging, vol. 27, No. 9, Sep. 2008(1189-1201).

Yefeng Zheng, et al., Four-Chamber Heart Modeling and Automatic Segmentation for 3-D Cardiac CT Volumes Using Marginal Space Learning and Steerable Features:IEEE Transactions on Medical Imaging, vol. 27, No. 11, Nov. 2008(1668-1681).

(Continued)

*Primary Examiner* — Andrew W Johns
(74) *Attorney, Agent, or Firm* — Metis IP LLC

(57) ABSTRACT

A method for image segmentation may include acquiring an image including a region of interest (ROI). The ROI has a first margin, the ROI includes a subregion, and the subregion has a second margin. The method may further include acquiring a first model according to the ROI, wherein the first model has a third margin. The method may further determine, based on the first margin and the third margin, a second model by matching the first model with the image, wherein the second model includes a sub-model, and the sub-model has a fourth margin. The method may further include determining, based on the second margin, a third model by adjusting the fourth margin of the sub-model in the second model. The method may further include segmenting the ROI according to the third model and generating a segmented ROI based on a result of the segmentation.

20 Claims, 27 Drawing Sheets

(30) Foreign Application Priority Data

May 5, 2017 (CN) .......................... 2017 1 0311910
May 5, 2017 (CN) .......................... 2017 1 0312269

(52) U.S. Cl.
CPC ............... *G06T 2207/20081* (2013.01); *G06T 2207/20116* (2013.01); *G06T 2207/20121* (2013.01); *G06T 2207/20124* (2013.01); *G06T 2207/30048* (2013.01)

(58) Field of Classification Search
CPC . G06T 2207/20112; G06T 2207/20121; G06T 2207/20124; G06T 2207/30048; G06K 9/34; G06K 2209/05; G06K 2209/051; A61B 6/503; A61B 6/5217; A61B 8/5223
See application file for complete search history.

(56) References Cited

U.S. PATENT DOCUMENTS

2016/0051214 A1* 2/2016 Li et al. ................. A61B 6/503
 382/131
2016/0063726 A1 3/2016 Wenzel et al. ........ G06T 7/0089

OTHER PUBLICATIONS

Jochen Peters, et al., Segmentation of the heart and major vascular structures in cardiovascular CT images: ResearchGate, Proc. of SPIE vol. 6914, 691417-1 (2008).
First Office Action in Chinese Application No. 201710311908.8 dated Jul. 3, 2018, 13 pages.
Ling Hua-Qiang et al., Application of active shape model in segmentation of liver CT image, Journal of zhejiang university of technology, 40(4): 451-453, 2012.

* cited by examiner

SYSTEMS AND METHODS FOR IMAGE PROCESSING

CROSS-REFERENCE TO RELATED APPLICATIONS

The application claims priority of Chinese application No. 201710312269.7 filed on May 5, 2017, Chinese application No. 201710311908.8 filed on May 5, 2017, Chinese application No. 201710311691.0 filed on May 5, 2017, Chinese application No. 201710311910.5 filed on May 5, 2017, the contents of each of which are incorporated herein by reference.

TECHNICAL FIELD

The present disclosure generally relates to systems and methods for image processing, and more particularly, systems and methods for image segmentation.

BACKGROUND

With the development of life quality and an extension of life span, cardiovascular diseases are becoming a major cause of deaths for human beings. An early diagnosis of cardiovascular diseases may reduce the death rate of cardiovascular diseases. An analysis of imaging findings and functional data of cardiac structures may be important for the diagnosis. Image segmentation may play an important role in the analysis. A segmented image may be used for various applications, for example, a quantitative analysis of a tissue volume, a location of a pathological tissue, a study of an anatomical structure, a preparation of a treatment planning.

A cardiac chamber may be segmented in a reconstructed image. A deformable model may be used for segmenting the cardiac chamber. The segmentation may be achieved based on matching the deformable model with the reconstructed image. However, there may be various cardiac chambers in a single image, and the various cardiac chambers may have effects on each other. Thus, it may be difficult to segment each of the various cardiac chambers. Therefore, it would be desirable to develop a technique for segmenting various cardiac chambers.

SUMMARY

One aspect of the present disclosure relates to an image processing method. The method may be implemented on at least one machine each of which has at least one processor and one storage. The method may include one or more of the following operations. An image including a region of interest (ROI) may be acquired. The ROI may have a first margin. The ROI may include a subregion having a second margin. A first model according to the ROI may be acquired. The first model may have a third margin. A second model may be determined based on the first margin and the third margin by matching the first model with the image. The second model may include a sub-model having a fourth margin. A third model may be determined based on the second margin by adjusting the fourth margin of the sub-model of the second model. The ROI may be segmented according to the third model. A segmented ROI may be generated based on a result of the segmentation.

Another aspect of the present disclosure relates to an image processing system. The system may include at least one processor and a storage configured to store instructions. The instructions, when executed by the at least one processor, may cause the system to effectuate the method. The method may include one or more of the following operations. An image including a region of interest (ROI) may be acquired. The ROI may have a first margin. The ROI may include a subregion having a second margin. A first model according to the ROI may be acquired. The first model may have a third margin. A second model may be determined based on the first margin and the third margin by matching the first model with the image. The second model may include a sub-model having a fourth margin. A third model may be determined based on the second margin by adjusting the fourth margin of the sub-model of the second model. The ROI may be segmented according to the third model. A segmented ROI may be generated based on a result of the segmentation.

A further aspect of the present disclosure relates to a non-transitory computer readable medium storing instructions. The instructions, when executed by at least one processor, may cause the at least one processor to implement the method. The method may include one or more of the following operations. An image including a region of interest (ROI) may be acquired. The ROI may have a first margin. The ROI may include a subregion having a second margin. A first model according to the ROI may be acquired. The first model may have a third margin. A second model may be determined based on the first margin and the third margin by matching the first model with the image. The second model may include a sub-model having a fourth margin. A third model may be determined based on the second margin by adjusting the fourth margin of the sub-model of the second model. The ROI may be segmented according to the third model. A segmented ROI may be generated based on a result of the segmentation.

In some embodiments, the acquisition of the first model may include one or more of the following operations. At least one preliminary model corresponding to the ROI may be acquired. One or more control points of the at least one preliminary model may be determined. The first model may be generated based on the one or more control points.

In some embodiments, the generation of the first model based on the one or more control points may include one or more of the following operations. A correlation factor may be determined based on the relationship between the one or more controls points and a fifth margin of the at least one preliminary model. The first model may be generated based on the correlation factor and the one or more control points.

In some embodiments, the determination of the third model may include one or more of the following operations. A margin point on the fourth margin may be determined. A target point corresponding to the margin point may be determined based on the second margin. The target point may be within a range of the fourth margin. The fourth margin may be adjusted based on the margin point and the target point.

In some embodiments, the determination of the target point may include one or more of the following operations. A candidate point within the range of the fourth margin may be determined based on the margin point. A probability that the candidate point is the target point may be determined based on the second margin. The target point may be determined based on the probability.

In some embodiments, the adjustment of the fourth margin of the sub-model may include one or more of the following operations. A transformed margin point may be determined based on the target point by performing a similarity transformation on a margin point of the fourth margin. The fourth margin of the sub-model may be adjusted by performing a piecewise-affine transformation on the transformed margin point based on a correlation factor, or by adjusting the transformed margin point based on an energy function.

In some embodiments, the determination of the probability that the candidate point is the target point may include one or more of the following operations. A classifier may be obtained. The probability of the candidate point may be determined by the classifier.

In some embodiments, the classifier may be generated according to a process for generating a classifier. The process may include one or more of the following operations. A preliminary classifier may be obtained. A plurality of sample points related to the ROI may be acquired. The plurality of sample points may be classified into two or more groups. The preliminary classifier may be trained based on the sample points and the two or more groups to generate the classifier.

In some embodiments, the classification of the plurality of sample points into the two or more groups may include classifying the plurality of sample points into the two or more groups based on sharpness information or position information of the plurality of sample points.

In some embodiments, at least one group of the two or more groups of the sample points may include a plurality of positive sample points and a plurality of negative sample points. The positive sample points may reside on or within a range of a sixth margin of the ROI. The negative sample points may reside beyond a distance from the sixth margin of the ROI.

In some embodiments, the determination of the second model by matching the first model with the image may include one or more of the following operations. A margin probability map of the image may be determined. The first model may be matched with the margin probability map to determine the second model.

In some embodiments, the matching of the first model with the margin probability map may be performed based on a Hough transformation.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
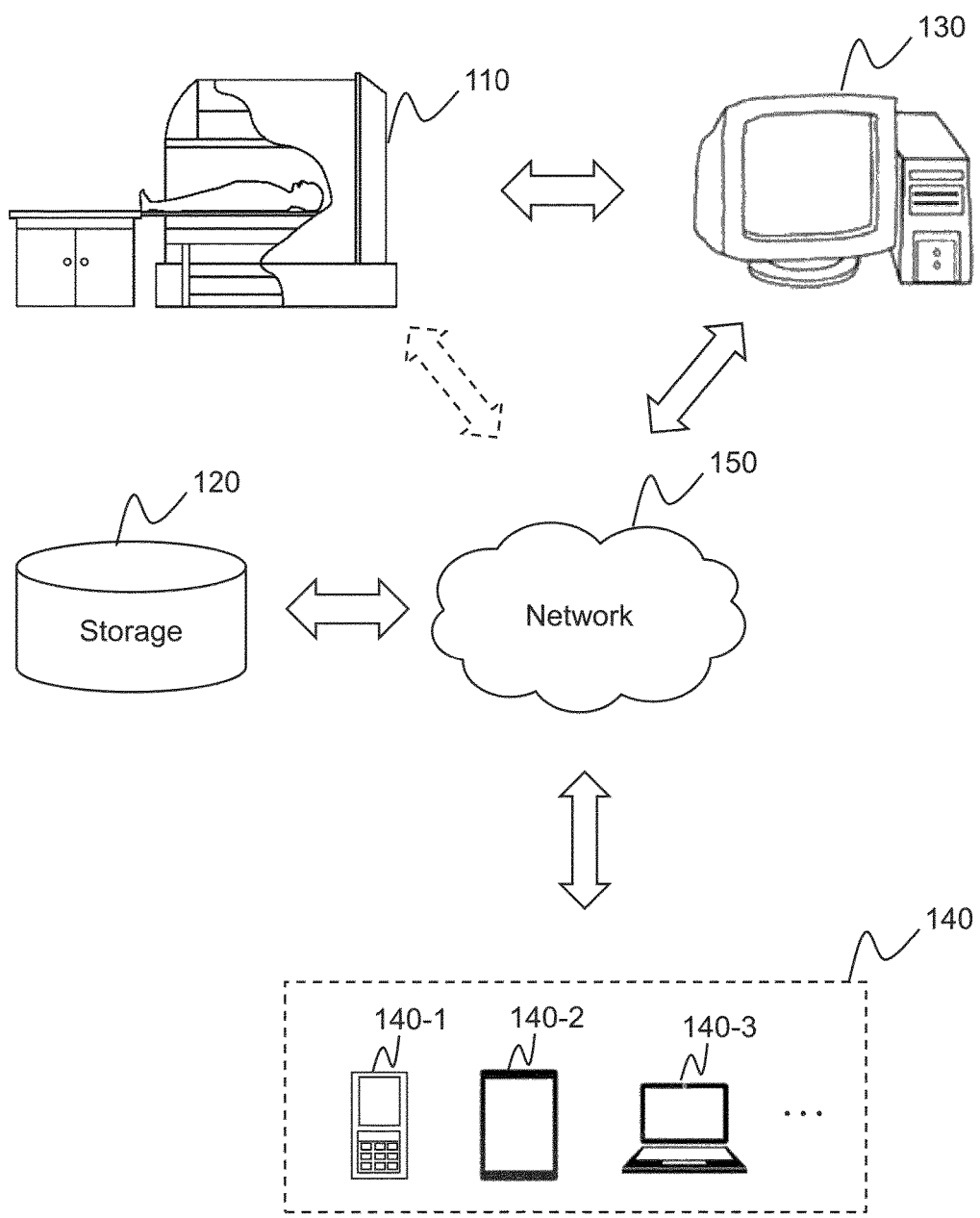
FIG. 1 is a schematic diagram illustrating an exemplary imaging system according to some embodiments of the present disclosure.

In the following detailed description, numerous specific details are set forth by way of example in order to provide a thorough understanding of the relevant application. However, it should be apparent to those skilled in the art that the present application may be practiced without such details. In other instances, well-known methods, procedures, systems, components, and/or circuitry have been described at a relatively high-level, without detail, in order to avoid unnecessarily obscuring aspects of the present application. Various modifications to the disclosed embodiments will be readily apparent to those skilled in the art, and the general principles defined herein may be applied to other embodiments and applications without departing from the spirit and scope of the present application. Thus, the present application is not limited to the embodiments shown, but to be accorded the widest scope consistent with the claims.

It will be understood that when a unit, module or block is referred to as being "on," "connected to," "communicate with," "coupled to" another unit, module, or block, it may be directly on, connected or coupled to, or communicate with the other unit, module, or block, or an intervening unit, engine, module, or block may be present, unless the context clearly indicates otherwise. As used herein, the term "and/or" includes any and all combinations of one or more of the associated listed items.

The terminology used herein is to describe particular examples and embodiments only and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In an image processing, an image segmentation (or "recognition," "classification," "extraction," "determination," "identification," etc.) may be performed to provide an image for a target region by dividing or partitioning an image of a larger region including the target region. In some embodiments, the imaging system may include one or more modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, the target region may be an organ, texture, an object, a lesion, a tumor, or the like, or any combination thereof. Merely by way for example, the target region may include a head, a breast, a lung, a rib, a vertebra, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the image may include a two dimensional (2D) image and/or a three dimensional (3D) image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

The segmentation process may be performed by recognizing one or more characteristic values or features of one or more pixels and/or voxels in an image. In some embodiments, the characteristic values or features may include a gray level, a mean gray level, an intensity, texture, color, contrast, brightness, or the like, or any combination thereof. In some embodiments, one or more spatial properties of the pixel(s) and/or voxel(s) may also be considered in a segmentation process.

An aspect of the present disclosure relates to image processing methods for segmenting one or more cardiac chambers in an image, and image processing systems on which the disclosured method are implemented. The methods may include obtaining a model by matching an image with a model related to the one or more cardiac chambers. The methods may further include adjusting the matched model based on the image. The methods may further include generating a segmented image based on the adjusted matched model.

For illustration purposes, the following description is provided to help better understanding a segmentation process. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

FIG. 1 is a schematic diagram illustrating an exemplary imaging system according to some embodiments of the present disclosure. As shown, the imaging system 100 may include a scanner 110, a storage 120, a processing device 130, one or more terminals 140, and a network 150.

The scanner 110 may scan an object, and/or generate a plurality of data relating to the object. The scanner 110 may further reconstruct an image from the plurality of data. In some embodiments, the scanner 110 may be a medical imaging device, for example, a PET device, a SPECT device, a CT device, an MRI device, or the like, or any combination thereof (e.g., a PET-CT device, a PET-MRI device, or a CT-MRI device). The scanner 110 may include a gantry, a detector, a detecting region, and a table. In some embodiments, the scanner 110 may also include a radioactive scanning source. An object may be placed on the table for scanning. In some embodiments, the object may be a human body, an animal, or any part thereof. For example, the object may be a head, a chest, an abdomen, a pelvis, a perineum, a limb, a vertebra. In some embodiments, the image may include a cardiac image. In some embodiments, the cardiac image may include an omnidirectional digital cardiac image, a digital cardiac tomosynthesis image, a cardiac phase contrast image, a computed radiography (CR) cardiac image, a multimodality cardiac image, etc. The image may be a 2D or 3D image. The image may be in one or more formats including, for example, JPEG, TIFF, GIF, FPX. The image may be stored in the storage 120, or transmitted to the processing device 130 for image processing. It should be noted that cardiac images are used for describing the method and system in the present disclosure. However, for persons having ordinary skills in the art, the method and system may be employed for processing images of various types.

The storage 120 may store data, instructions, and/or any other information. In some embodiments, the storage 120 may store data obtained from the terminal 140 and/or the processing device 130. In some embodiments, the storage 120 may store data and/or instructions that the processing device 130 may execute or use to perform exemplary methods described in the present disclosure. In some embodiments, the storage 120 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double data rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 120 may be connected to the network 150 to communicate with one or more other components of the imaging system 100 (e.g., the processing device 130, the terminal(s) 140). One or more components of the imaging system 100 may access the data or instructions stored in the storage 120 via the network 150. In some embodiments, the storage 120 may be directly connected to or communicate with one or more other components of the imaging system 100 (e.g., the processing device 130, the terminal(s) 140). In some embodiments, the storage 120 may be part of the processing device 130.

The processing device 130 may process data and/or information obtained from the scanner 110, the storage 120, and/or the terminal(s) 140. In some embodiments, the processing device 130 may be a single server or a server group. The server group may be centralized or distributed. In some embodiments, the processing device 130 may be local to or remote from one or more other components of the imaging system 100. For example, the processing device 130 may access information and/or data stored in the scanner 110, the terminal(s) 140, and/or the storage 120 via the network 150. As another example, the processing device 130 may be directly connected to the scanner 110, the terminal(s) 140 and/or the storage 120 to access stored information and/or data. In some embodiments, the processing device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 130 may be implemented by a computing device 200 having one or more components as illustrated in FIG. 2.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Halolens™ a Gear VR™. In some embodiments, the terminal(s) 140 may be part of the processing device 130.

The network 150 may include any suitable network that can facilitate the exchange of information and/or data for the imaging system 100. In some embodiments, one or more components of the imaging system 100 (e.g., the scanner 110, the terminal(s) 140, the processing device 130, the storage 120) may communicate information and/or data with one or more other components of the imaging system 100 via the network 150. For example, the processing device 130 may obtain image data from the scanner 110 via the network 150. As another example, the processing device 130 may obtain user instructions from the terminal(s) 140 via the network 150. The network 150 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or Internet exchange points through which one or more components of the imaging system 100 may be connected to the network 150 to exchange data and/or information.

Figure 2:
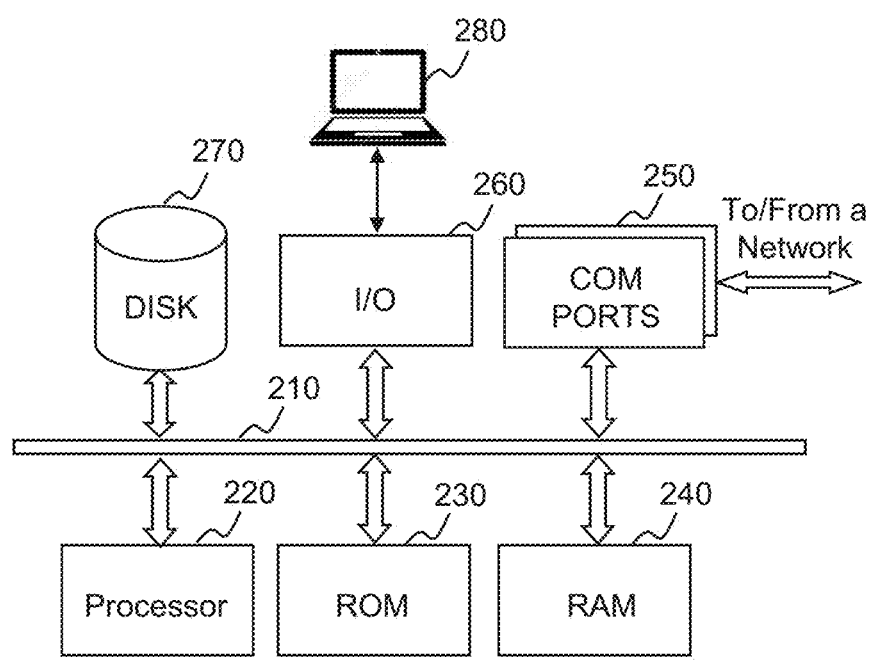
FIG. 2 is a schematic diagram illustrating hardware and/or software components of an exemplary computing device on which a processing engine may be implemented according to some embodiments of the present disclosure.

FIG. 2 is a schematic diagram illustrating exemplary hardware and/or software components of an exemplary computing device 200 on which the processing device 130 may be implemented according to some embodiments of the present disclosure. As illustrated in FIG. 2, the computing device 200 may include an internal communication bus 210, a processor 220, a read-only memory (ROM) 230, a random access memory (RAM) 240, a communication port 250, an input/output (I/O) 260, a disk 270, and a display 280 connected to the I/O 260.

The internal communication bus 210 may be used for data communication. In some embodiments, components of the computing device 200 may communicate data with each other via the internal communication bus 210. For example, the processor 220 may send data to the ROM 230, the RAM 240, or the I/O 260. In some embodiments, the data may include an instruction code, status information and/or control information. In some embodiments, the internal communication bus 210 may include an Industry Standard Architecture (ISA) bus, an Extended Industry Standard Architecture (EISA) bus, a Video Electronic Standard Association (VESA) bus, a peripheral component interconnect (PCI) bus, or the like, or any combination thereof.

The processor 220 may execute computer instructions (e.g., program code) and perform functions of the processing device 130 in accordance with techniques described herein. The computer instructions may include, for example, routines, programs, objects, components, data structures, procedures, modules, and functions, which perform particular functions described herein. For example, the processor 220 may process image data obtained from the scanner 110, the terminal 140, the storage 120, and/or any other component of the imaging system 100. In some embodiments, the processor 220 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The ROM 230 may be employed for power on self-test of the processing device 130, initialization of the components of the processing device 130, drive programs of the I/O of the processing device 130. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The RAM 240 may store an operating system, applications, data, etc. The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc.

The communication port 250 may be connected to a network (e.g., the network 150) to facilitate data communications. The communication port 250 may establish connections between the processing device 130 and the scanner 110, the terminal 140, and/or the storage 120. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 250 may be a specially designed communication port. For example, the communication port 250 may be designed in accordance with the digital imaging and communications in medicine (DICOM) protocol.

The I/O 260 may input and/or output signals, data, information, etc. In some embodiments, the I/O 260 may enable a user interaction with the processing device 130. In some embodiments, the I/O 260 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The disk 270 may store data or information generated by the processing device 130. The disk 270 may include a hard disk drive (HDD), a solid-state drive (SSD), a hybrid hard drive (HHD), etc.

The display 280 may present data or information generated by the processing device 130 to a user. In some embodiments, the display 280 may include a physical display including, for example, a display with a loudspeaker, a liquid crystal display (LCD), a light emitting diode (LED) display, an organic light emitting diode (OLED) display, an E-ink display.

Figure 3:
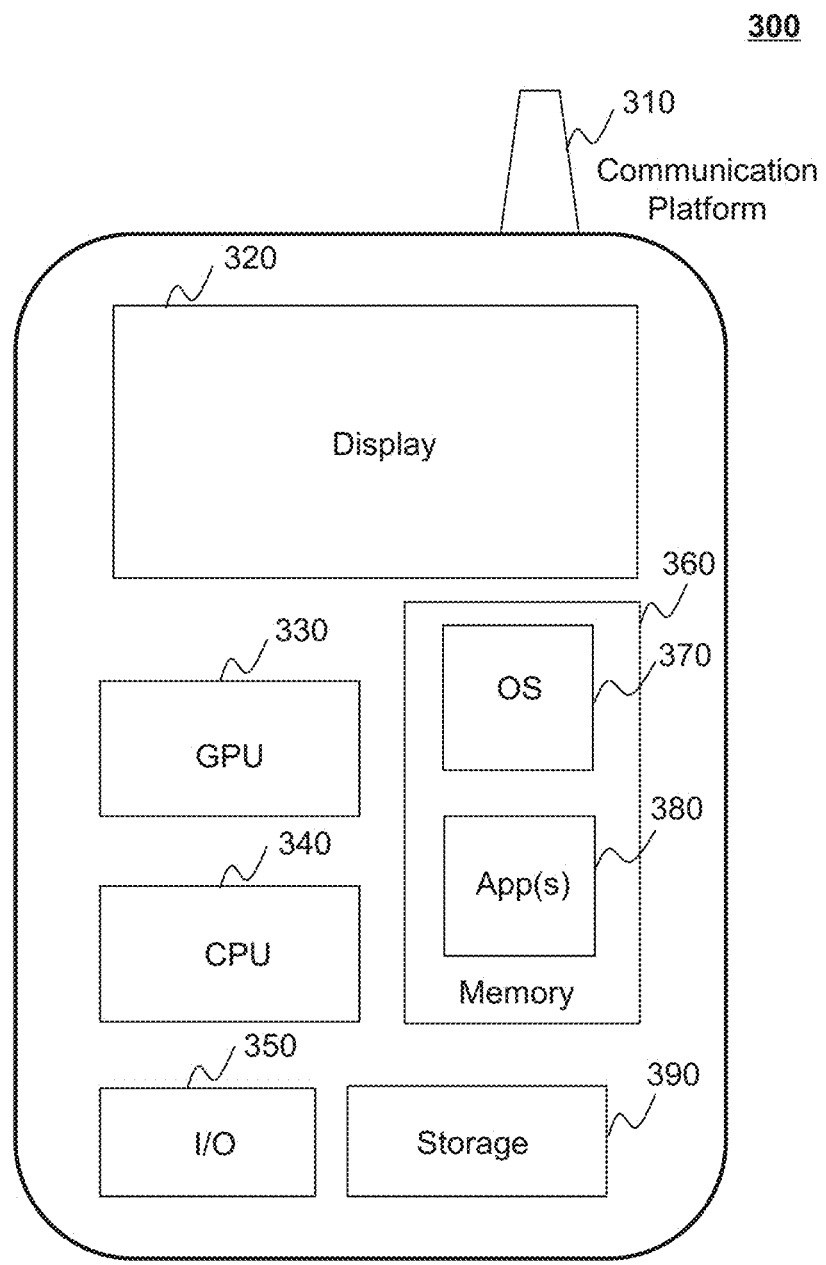
FIG. 3 is a schematic diagram illustrating hardware and/or software components of an exemplary mobile device on which a terminal may be implemented according to some embodiments of the present disclosure.

FIG. 3 is a schematic diagram illustrating exemplary hardware and/or software components of an exemplary mobile device 300 on which the terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phones™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 130. User interactions with the information stream may be achieved via the I/O 350 and provided to the processing device 130 and/or other components of the imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
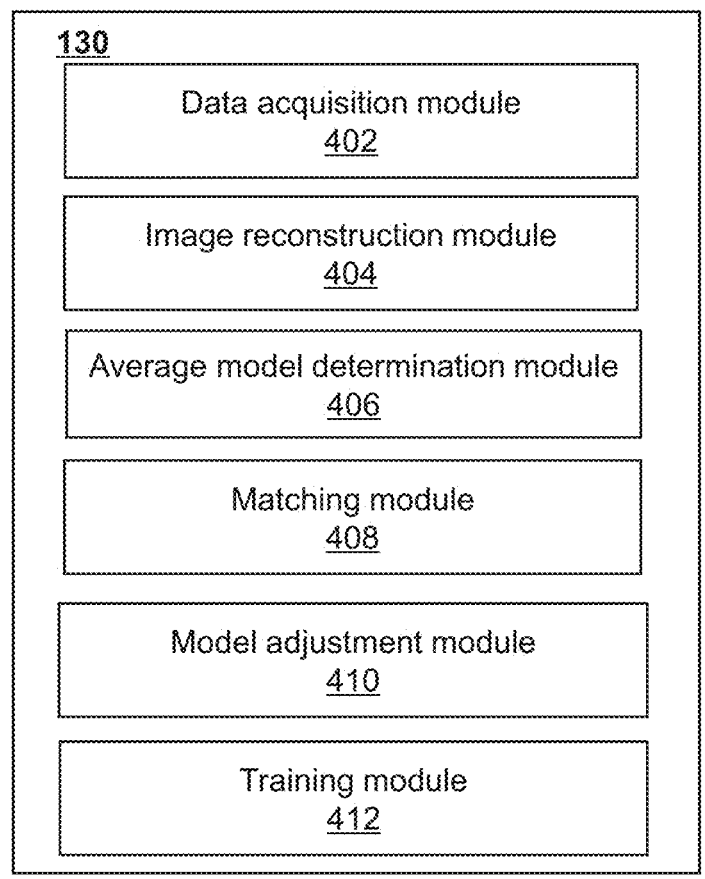
FIG. 4 is a block diagram illustrating an exemplary processing device according to some embodiments of the present disclosure.

FIG. 4 is a block diagram illustrating an exemplary processing device 130 according to some embodiments of the present disclosure. The processing device 130 may include a data acquisition module 402, an image reconstruction module 404, an average model determination module 406, a matching module 408, a model adjustment module 410, and a training module 412. At least a portion of the processing device 130 may be implemented in the computing device 200 illustrated in FIG. 2 (e.g., the processor 220) or the mobile device 300 illustrated in FIG. 3 (e.g., CPU 340). Generally, the terms "module," "unit," and/or "engine" used herein, refers to logic embodied in hardware or firmware, or to a collection of software instructions. The modules, units, and engines described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 220 or CPU 340) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

The data acquisition module 402 may acquire image data relating to a region of interest (ROI). The image data may be acquired from an internal data source of the imaging system 100 (e.g., the scanner 110 or the storage 120) or an external data source connected to the imaging system 100 via the network (e.g., a database located on a cloud). The image data may be generated by scanning an object or a portion thereof. In some embodiments, the data acquisition module 402 may pre-process the image data to make the image data suitable for a subsequent operation. In some embodiments, the data acquisition module 402 may transmit the image data to the image reconstruction module 404 to reconstruct an image. In some embodiments, the data acquisition module 402 may receive an instruction and perform the data acquisition process according to the instruction.

The image reconstruction module 404 may reconstruct an image including an ROI. An image reconstruction may refer to the generation of an image based on scanning data that is acquired at different times, at different angles, or at different positions of a patient. According to the scanning data, the image reconstruction module 404 may determine a feature or condition of the ROI, for example, the absorption ability of radiation in the ROI, the density of the ROI, and thus reconstruct the image including the ROI. The reconstructed image may be a 2D image or a 3D image. In some embodiments, the image reconstruction module 404 may reconstruct the image based on image data acquired by the data acquisition module 402.

The average model determination module 406 may determine an average model of an object (e.g., the ROI as described elsewhere in the disclosure). In some embodiments, the average model may be determined based on one or more preliminary models of the object. In some embodiments, the average model may include a 3D average cardiac model including one or more cardiac chambers. The average model determination module 406 may register the preliminary models based on at least one preliminary model.

In some embodiments, the average model determination module 406 may determine a margin of a cardiac chamber for each registered preliminary model. Based on the determined margins of cardiac chambers in each registered preliminary model, the average model determination module 406 may determine an average cardiac model that includes different cardiac chambers. In some embodiments, the average model determination module 406 may determine one or more control points on the margin and construct an average cardiac model based on the control point(s).

The matching module 408 may match a model with an image. In some embodiments, the model may include a 3D average cardiac model, and the image may include a 3D cardiac image. In some embodiments, the matching module 408 may include one or more units as described in connection with FIG. 8. The matching module 408 may match the model with the image using more or more matching techniques. Exemplary matching techniques may include NNDR (nearest neighbor distance ratio) based matching technique, neighboring feature points searching technique, target detection based on Hough transformation, or the like, or any combination thereof. In some embodiments, the matching module 408 may match the model with the image using Hough transformation to obtain a matched model.

Figure 26:
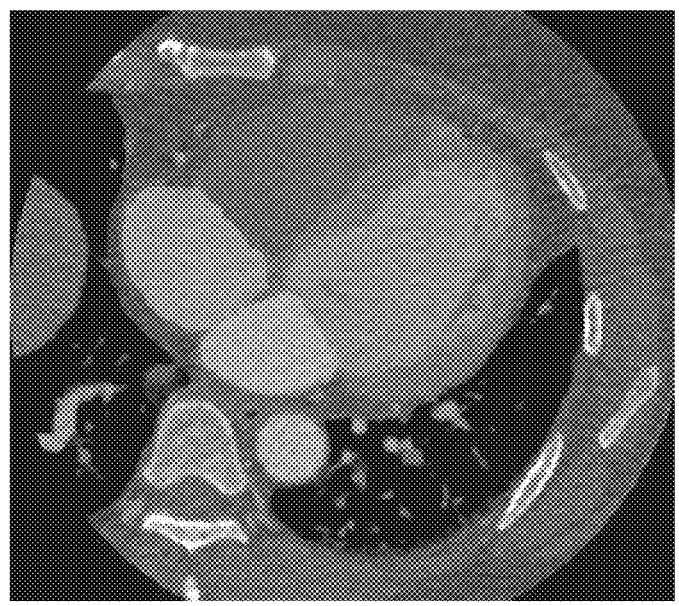
FIG. 26 is a schematic diagram illustrating segmented chambers according to some embodiments of the present disclosure.

The model adjustment module 410 may adjust a model (e.g., a matched model generated by the matching module 408). In some embodiments, the model adjustment module 410 may include one or more units as described in FIG. 7A. In some embodiments, the model adjustment module 410 may determine a candidate point within a range of a margin point on the model. The model adjustment module 410 may determine a probability that the candidate point is a target point and adjust the margin based on the probability of the candidate point. A target point may be the point that resides on the desired margin related to the matched model. The model adjustment module 410 may adjust the model using one or more techniques including a similarity transformation, an affine transformation, an adjustment based on an energy function, or the like, or any combination thereof. In some embodiments, the model adjustment module 410 may convert the adjusted model into an image. The image converted from the adjusted model may be, for example, a segmented image including cardiac chambers as illustrated in FIG. 26.

The training module 412 may train a preliminary classifier to obtain a trained classifier. The trained classifier may be used to determine a probability that a point belongs to a margin of a cardiac chamber. The training module 412 may train the preliminary classifier by a plurality of sample points. The sample points may include positive sample points and negative sample points. The positive sample points may refer to the points that reside on or within a range of a margin of a cardiac chamber. The negative sample points may refer to the points that reside beyond a distance from a margin of a cardiac chamber. In some embodiments, the training module 412 may classify the plurality of sample points into two or more groups based on the anatomical position of the sample points. For example, the plurality of sample points may be classified into a group related to the left ventricle, a group related to the left atrium, a group related to the right ventricle, a group related to the right atrium, a group related to the aorta or a group related to the myocardium. As another example, the plurality of sample points may be classified into a group related to left ventricle margin, a group related to left atrium sharp margin, a group related to left atrium dull margin, a group related to right ventricle sharp margin, a group related to right ventricle dull margin, a group related to right atrium sharp margin, a group related to right atrium dull margin, a group related to aorta margin, a group related to left ventricular myocardium sharp margin or a group related to left ventricular myocardium dull margin.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. In some embodiments, the processing device 130 may include one or more modules. For example, the processing device 130 may include a storage module that is used to store data generated by other components of the processing device 130 or input by a user. However, those variations and modifications do not depart the scope of the present disclosure.

Figure 5:
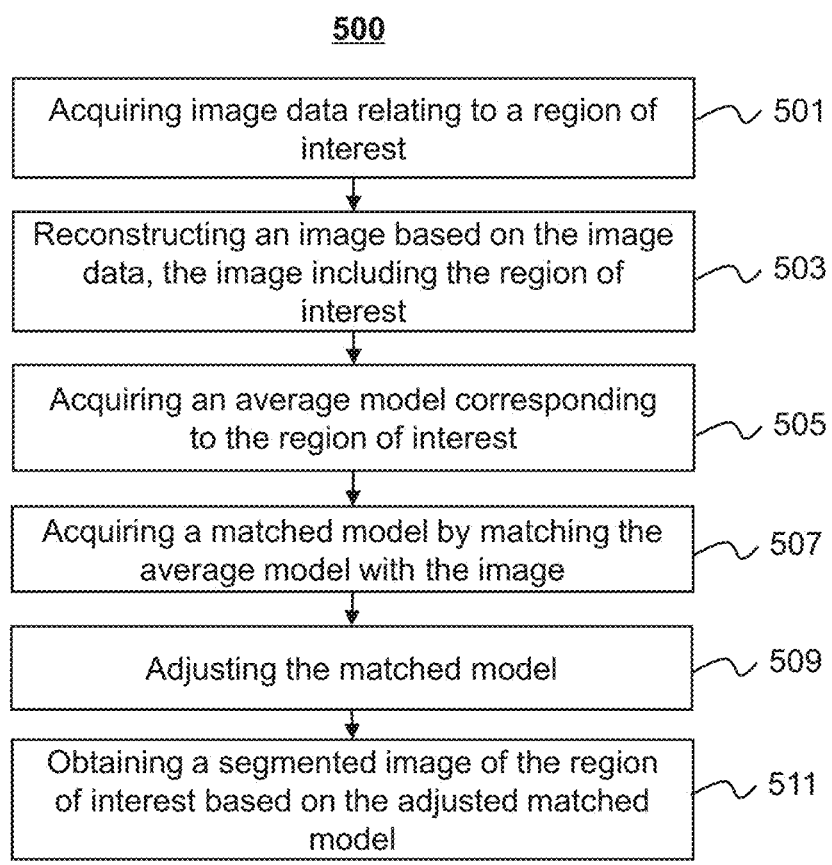
FIG. 5 is a flowchart of an exemplary process for obtaining a segmented image of a region of interest according to some embodiments of the present disclosure.

FIG. 5 is a flowchart illustrating an exemplary process for obtaining a segmented image of an ROI according to some embodiments of the present disclosure. In some embodiments, process 500 may be performed by the processing device 130. At least a portion of process 500 may be implemented in the computing device 200 illustrated in FIG. 2 (e.g., the processor 220) or the mobile device 300 illustrated in FIG. 3 (e.g., CPU 340).

In 501, image data relating to an ROI may be acquired. In some embodiments, the image data relating to the ROI may be acquired by the data acquisition module 402. The image data may relate to an object. In some embodiments, the image data may be generated by a full scanning of an entire body of the object, and the image data may include information relating to the entire body of the object. In some embodiments, the image data may be generated by scanning one or more portions of the object, and the image data may include information relating to the one or more portions of the object. The one or more portions may include a chest, a trunk, an upper limb, a lower limb, a head, an organ, tissue, etc. The image data may be 2D image data or 3D image data. The image data may include MRI image data, CT image data, X-ray image data, ultrasonic image data, PET image data, or the like, or any combination thereof. The image data may include original data (scanning data) generated by the scanner 110, image generated based on the original data, algorithms used to process images, sample images of the ROI, models related to the ROI, parameters employed to determine a model, intermediate data, or the like, or a combination thereof. In some embodiments, the image data may be pre-processed to render the image data suitable for a subsequent operation. The pre-processing may include data normalization, data smoothing, data suppressing, noise reduction, detail reduction, mutation reduction, or the like, or any combination thereof. The ROI may include a heart or a portion thereof. The portion of the heart may include one or more cardiac chambers of the heart.

In 503, an image including the ROI may be reconstructed based on the image data acquired or pre-processed by the data acquisition module 402. In some embodiments, the image including the ROI may be reconstructed by the image reconstruction module 404. Merely by way of example, the image may include an omnidirectional digital cardiac image, a digital cardiac tomosynthesis image, a cardiac phase contrast image, a computed radiography (CR) cardiac image, or a multi-modality cardiac image. The image may be in various formats, including, for example, JPEG, TIFF, GIF, FPX. The image may be reconstructed using one or more techniques. Exemplary techniques for reconstructing an image may include a simultaneous equation technique, a Fourier transform reconstruction technique, a direct back-projection reconstruction technique, a filtered back projection reconstruction technique, a Fourier back-projection reconstruction technique, a convolution back projection reconstruction technique, an iterative reconstruction technique, or the like, or any combination thereof. The image may be a 2D image or a 3D image. For example, the image reconstruction module 404 may reconstruct different cross-sectional cardiac images based on the acquired image data. The different cross-sectional cardiac images may include various information related to the heart. Exemplary information related to the heart may include the absorption ability for radiation of different parts in the heart, the density of different parts in the heart, etc. The reconstructed image(s) may be displayed on a display; or may be stored in one or more storages of the imaging system 100.

In 505, an average model corresponding to the ROI may be acquired. In some embodiments, the average model may be determined by the average model determination module 406. The average model may include a 2D grid model or a 3D grid model. In some embodiments, the average model may be determined based on one or more preliminary models of the object. In some embodiments, the average model may include a 3D average cardiac model, which may include one or more cardiac chambers. Preliminary models may be registered based on a reference model (e.g., one of the preliminary model). As used herein, the registration may refer to a process to align different preliminary models along the same direction and/or adjust the sizes of different preliminary models to achieve the same size or a substantially same size. As used herein, "substantially same" may indicate that the difference between sizes (e.g., volume) of different preliminary models is close to zero, or less than 30% of the size of a preliminary model, or less than 20% of the size of a preliminary model, or less than 10% of the size of a preliminary model.

In some embodiments, a margin of a cardiac chamber may be determined for each of the registered preliminary model. According to the determined margins of cardiac chambers in each registered preliminary model, an average cardiac model that includes different cardiac chambers may be determined. In some embodiments, the determination of a margin of a cardiac chamber in a preliminary model may be performed by a processor by executing instructions to identify the margin automatically. Alternatively or additionally, at least part of the determination of a margin of a cardiac chamber in a preliminary model may be performed according to an input from a user, for example, a doctor. For example, information of what the user labels or marks on the preliminary model may be received to determine the margin of the cardiac chamber.

In some embodiments, a relationship between two or more cardiac chambers in the average cardiac model may be determined. For example, a matrix of correlation factors representing the correlation between a margin point and a cardiac chamber (e.g., a margin of the cardiac chamber) may be determined. As used herein, a margin point refers to a point on a margin of a cardiac chamber.

In 507, a matched model may be acquired by matching the average model with the image. In some embodiments, the operation of matching may be performed by the matching module 408. The matching module 408 may match a first margin of the ROI in the image with a second margin of the average model. In some embodiments, the first margin of the ROI in the image may include at least an outer margin of the ROI (e.g., the margin that forms the outline of the heart), and the second margin of the average model may include at least an outer margin of the average model. Alternatively or additionally, the first margin of the ROI in the image may include at least an inner margin of the ROI (e.g., the margin that forms the outline of a cardiac chamber of the heart), and the second margin of the average model may include at least an inner margin of the average model (e.g., the margin that forms the outline of a subregion of the average model).

Figure 24:
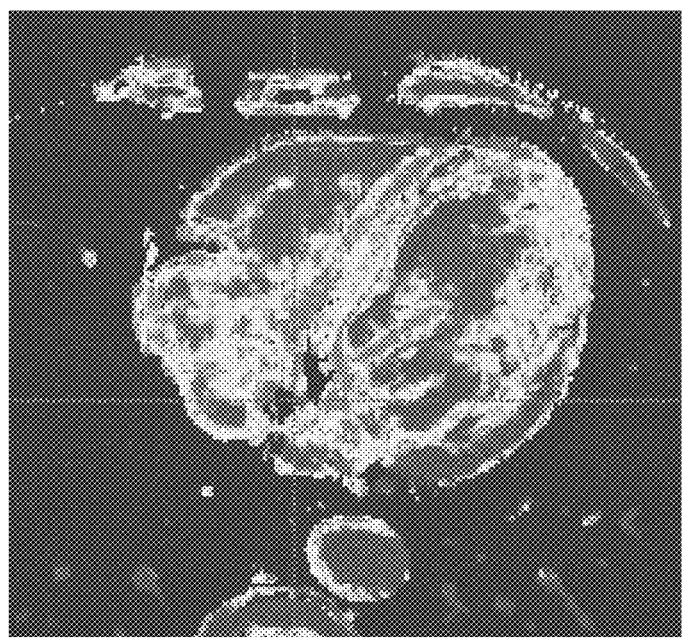
FIG. 24 is an exemplary probability map determined by a classifier according to some embodiments of the present disclosure.

Various matching techniques may be used to match the average model with the image, including, for example, NNDR-based matching technique, neighboring feature points searching technique, target detection based on Hough transformation, or the like, or any combination thereof. For better illustration, the generalized Hough transformation used in matching the average model with the image is provided as an example. The generalized Hough transform may be performed according to a probability that a point belongs to the first margin of the ROI in the image. A point may refer to a pixel (for a 2D image) or a voxel (for a 3D image) herein. The probability that the point belongs to the first margin may be determined by one or more trained classifiers as described elsewhere in the disclosure (e.g., a trained classifier as described in connection with FIG. 16). Additionally or alternatively, the generalized Hough transformation may be performed according to a probability map of the ROI. The probability map may be determined based on the probability that each point belongs to the first margin of the ROI in the image. Exemplary probability maps may include a grayscale gradient image, a color gradient image (e.g., as illustrated in FIG. 24), etc. In some embodiments, the image may be pre-processed before determining the probability that a point belongs to the first margin of the ROI in the image. For example, a point that resides a certain distance from the first margin of the ROI in the image may be removed, thereby reducing the calculation amount of the classifier(s). For instance, for a CT image, the CT value of a point belonging to a muscular tissue may be greater than −50. A point with a CT value less than −50 may be marked with a mask and excluded from the determination of probability by the classifier. More descriptions regarding the operation of matching may be found elsewhere in the present disclosure (e.g., FIG. 9 and the description thereof).

In 509, the matched model may be adjusted. In some embodiments, the adjustment of the matched model may be performed by the module adjustment module 410. In some embodiments, the model adjustment module 410 may determine a target point corresponding to a margin point of the matched model (e.g., a margin point of an inner margin). The model adjustment module 410 may adjust the matched model based on the margin point of the matched model and the corresponding target point. In some embodiments, the model adjustment module 410 may determine a candidate point within a range of a margin point (e.g., a margin point of an inner margin) on the matched model. For example, a point located apart from the margin point by a distance that is less than a threshold (e.g., a distance of a number of pixels) from the margin point may be determined as a candidate point. The model adjustment module 410 may also determine a probability that the candidate point is a target point. The model adjustment module 410 may further adjust the matched model based on the determined probability. The determination of the probability may be performed by a classifier that is trained based on the average models or the preliminary models as described elsewhere in the disclosure (e.g., a trained classifier as described in connection with FIG. 16). In some embodiments, the operation 509 may include performing a transformation on the matched model based on the target point. The transformation may include a similarity transformation, an affine transformation, an adjustment based on an energy function, or the like, or any combination thereof. More descriptions regarding the adjustment to the matched model may be found elsewhere in the present disclosure (e.g., FIGS. 11 to 14 and the description thereof).

In 511, a segmented image of the ROI may be obtained based on the adjusted matched model. In some embodiments, the segmented image may be obtained by converting the adjusted matched model into an image. For example, the adjusted matched model may be converted to a cardiac image with differentiated cardiac chambers (e.g., as illustrated in FIG. 26).

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the operations 507 and 509 may be implemented as one operation. However, those variations and modifications do not depart the scope of the present disclosure.

Figure 6:
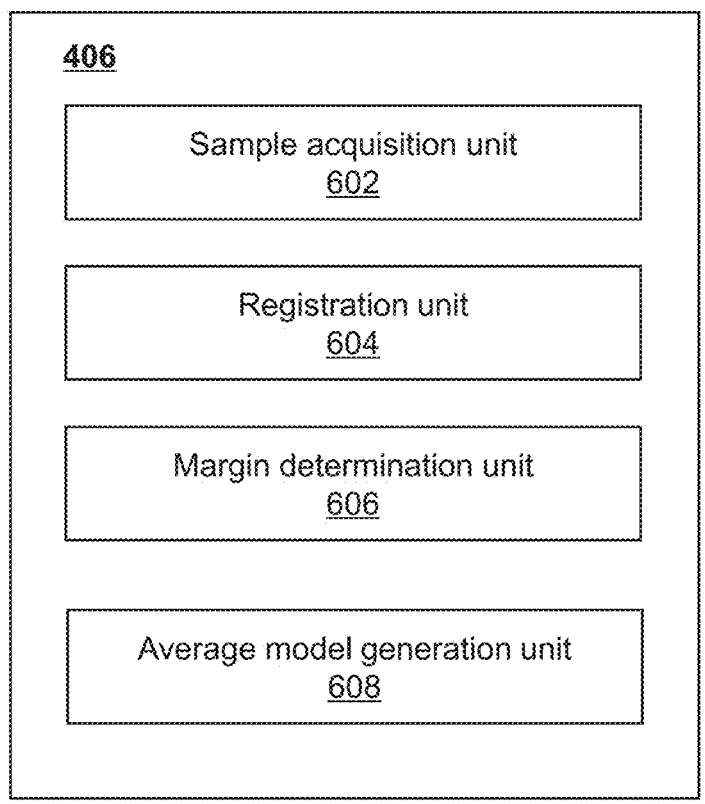
FIG. 6 is a block diagram illustrating an exemplary average model determination module according to some embodiments of the present disclosure.

FIG. 6 is a block diagram illustrating an exemplary average model determination module according to some embodiments of the present disclosure. The average model determination module 406 may include a sample acquisition unit 602, a registration unit 604, a margin determination unit 606, and an average model generation unit 608. At least a portion of the average model determination module 406 may be implemented in the computing device 200 illustrated in FIG. 2 (e.g., the processor 220) or the mobile device 300 illustrated in FIG. 3 (e.g., CPU 340).

The sample acquisition unit 602 may acquire one or more preliminary models. The preliminary model(s) may be acquired from the storage 120, and/or the terminal 140 of the imaging system 100. In some embodiments, the preliminary model(s) may be acquired from one or more components of the imaging system 100 (e.g., the scanner 110, the storage 120, the terminal 140) or an external data source connected to the imaging system 100 via the network 150.

The registration unit 604 may register the one or more preliminary models. Registration may refer to a process to align different preliminary models along the same direction and/or adjust the sizes of different preliminary to achieve the same size or a substantially same size. Various types of registration may be performed, including, for example, spatial dimensions based registration, a feature-based registration, a transformation property based registration, an optimized algorithm based registration, an image-modality based registration, an object based registration. In some embodiments, the one or more preliminary models may be modified to fit into the same coordinate system after the registration.

The margin determination unit 606 may determine a margin of a cardiac chamber on a model (e.g., a registered preliminary model). The margin determination unit 606 may delimit the margin of the cardiac chamber by labeling a plurality of points on or around the margin. In some embodiments, the margin determination unit 606 may divide a cardiac model into a plurality of portions. The plurality of portions may include, for example, a left ventricle, a left atrium, a right ventricle, a right atrium, an aorta, a myocardium. In some embodiments, the margin determination unit 606 may divide the margins of a cardiac model (e.g., outer margins, inner margins) into different categories based on a feature (e.g., sharpness) of the margins.

The average model generation unit 608 may generate an average model. In some embodiments, the average model generation unit 608 may generate a grid model corresponding to an average cardiac model. In some embodiments, the average model generation unit 608 may determine a plurality of control points on the margins of one or more models (e.g., registered preliminary model) and generate the average model based on the plurality of control points. For example, at least part of the plurality of control points may be connected to form a plurality of grids to generate the average model. In some embodiments, the plurality of control points may be adjusted based on a two-dimensional matrix of correlation factors. The two-dimensional matrix of correlation factors may represent a correlation between a cardiac chamber (e.g., a margin of the cardiac chamber) and a control point.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, two or more units in the average model determination module 406 may be integrated into a single unit. However, those variations and modifications do not depart the scope of the present disclosure.

Figure 7:
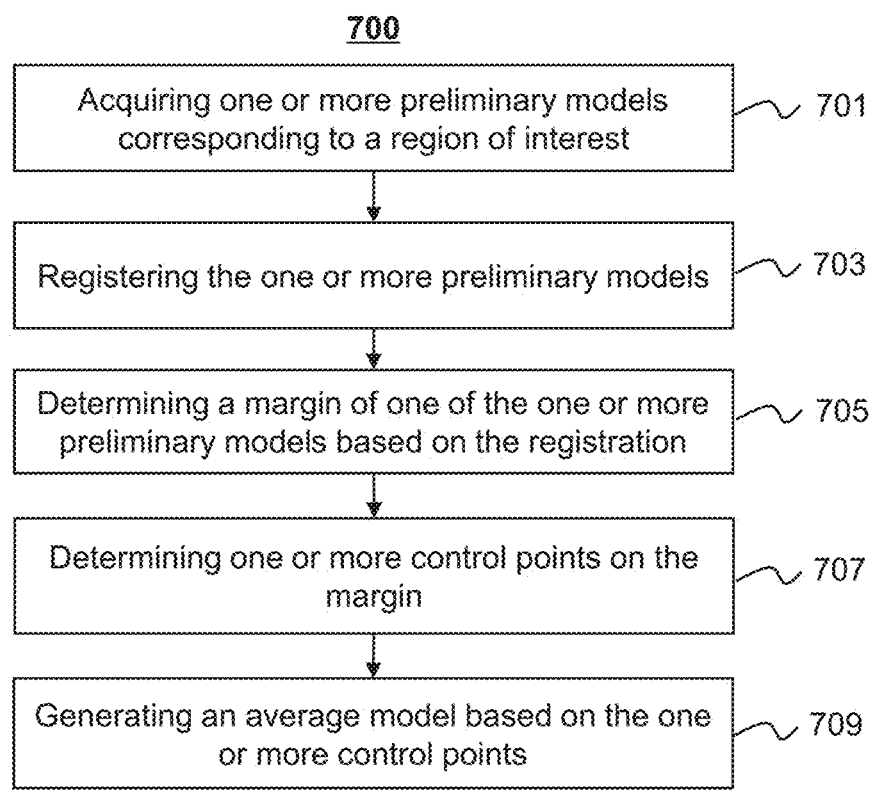
FIG. 7 is a flowchart of an exemplary process for generating an average model according to some embodiments of the present disclosure.

FIG. 7 is a flowchart illustrating an exemplary process for generating an average model according to some embodiments of the present disclosure. In some embodiments, the process 700 may be performed by the average model determination module 406. At least a portion of the process 700 may be implemented in the computing device 200 illustrated in FIG. 2 (e.g., the processor 220) or the mobile device 300 illustrated in FIG. 3 (e.g., CPU 340). In some embodiments, the average model acquired in the operation 505 of the process 500 may be determined or generated according to the process 700.

In 701, one or more preliminary models corresponding to an ROI may be acquired. The preliminary model(s) may be acquired from one or more components of the imaging system 100 (e.g., the scanner 110, the storage 120, the terminal 140) or an external data source connected to the imaging system 100 via the network 150. In some embodiments, the preliminary model(s) may include cardiac images that are acquired at different times, at different angles, or at different positions of an object. The cardiac images may include 2D images or 3D images. In some embodiments, the preliminary model(s) may include cardiac data of various objects acquired at different times, at different angles, or at different positions of the various objects. Algorithms or parameters related to modeling may also be acquired.

In 703, the one or more preliminary models may be registered. In some embodiments, the registration may be performed by the registration unit 604. In some embodiments, the one or more preliminary models may be modified to fit into the same coordinate system after the registration. Various types of registration may be performed. The types of registration may include a spatial-dimension based registration, a feature based registration, a transformation-property based registration, an optimized-algorithm based registration, an image-modality based registration, an object based registration, etc. The spatial-dimension based registration may include a 2D/2D registration, a 2D/3D registration, and/or a 3D/3D registration. The feature-based registration may include a registration based on a feature point (e.g., a point of discontinuity, a turning point, an intersection point), a registration based on a surface region (e.g., a curved line, a curved surface), a registration based on a pixel value, a registration based on an external feature, or the like, or any combination thereof. The transformation-property based registration may include a registration based on a rigid transformation, a registration based on an affine transformation, a registration based on a projective transformation, a registration based on a curved transformation, or the like, or any combination thereof. The optimized-algorithm based registration may include a registration based on a gradient descent technique, a registration based on Newton's technique, a registration based on Powell technique, a registration based on a genetic algorithm, or the like, or any combination thereof. The image-modality based registration may include a registration based on single modality, and/or registration based on multi-modality. The object based registration may include a registration of images of the same object, a registration of images of different objects, registration between an image and object related data, or the like, or any combination thereof.

Figure 17:
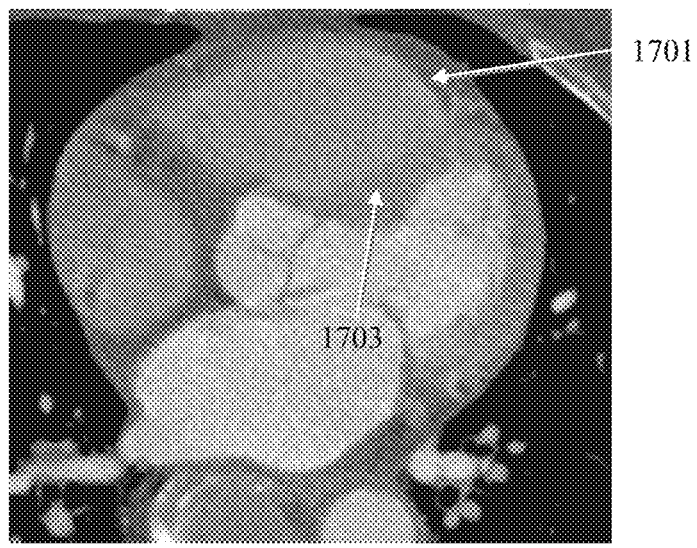
FIG. 17 is an exemplary image illustrating margin sharpness according to some embodiments of the present disclosure.
Figure 18:
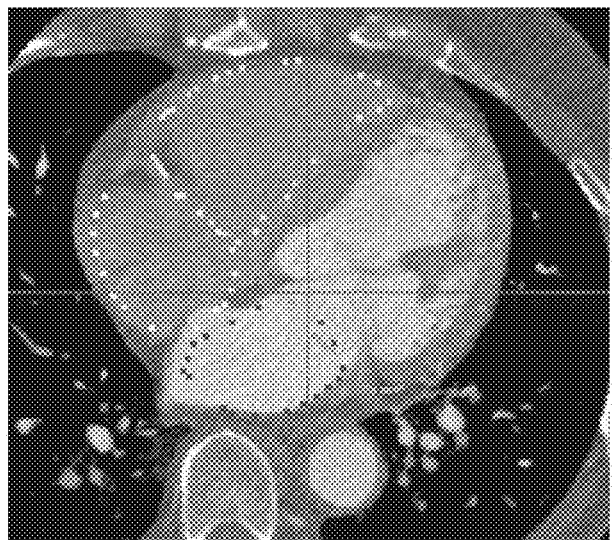
FIG. 18 is an exemplary image illustrating classification of margins according to some embodiments of the present disclosure.

In 705, a margin of one of the registered preliminary model(s)) may be determined. In some embodiments, the determination of the margin may be performed by the margin determination unit 606. The margin of the cardiac chamber may be delimited by labeling a plurality of points on or around the margin. The margin of a cardiac chamber may be manually labeled by a user or automatically labeled based on a feature of the cardiac chamber. In some embodiments, a cardiac model may be divided into a plurality of portions. The plurality of portions may include, for example, a left ventricle, a left atrium, a right ventricle, a right atrium, an aorta, myocardium. In some embodiments, the margins of a cardiac model (e.g., outer margins, inner margins) may be divided into different categories based on a feature (e.g., sharpness) of the margins. For example, the margins of a cardiac model may be determined to be a sharp margin or a dull margin based a degree of variation (also referred to as variation gradient) of the margin. Merely by way of example, as illustrated in FIG. 17, a margin 1701 is a sharp margin that connects to the external portion of the cardiac chambers. The gray level of the margin 1701 is less varied compared to that of the exterior of the cardiac chambers. A margin 1703 is a dull margin that resides between two cardiac chambers. The margin 1703 is greatly varied compared to the exterior of the cardiac chambers. The margins of a cardiac model may be divided into, for example, a left ventricle margin, a left atrium sharp margin, a left atrium dull margin, a right ventricle sharp margin, a right ventricle dull margin, a right atrium sharp margin, a right atrium dull margin, an aorta margin, a left ventricular myocardium sharp margin and a left ventricular myocardium dull margin (as illustrated in FIG. 18).

In 707, one or more control points on the margin may be determined. In some embodiments, the determination of the one or more control points may be performed by the average model generation unit 606. In some embodiments, an axis of a cardiac chamber may be determined based on the registration. The axis may be a line passing through any two points in the cardiac chamber. For example, the axis may be a line passing through two points having the largest distance from each other in the cardiac chamber. A plurality of image slices of the cardiac chamber along the direction of the axis may be further determined, and a set of points in each of the image slices may be determined. The set of points may include the margin points of the cardiac chamber in each of the image slices. The set of points may form a point model (e.g., the model illustrated in FIG. 19). In some embodiments, the control point(s) may be determined based on the point model. For example, the control point(s) may be a subset of the set of points. It shall be noted that a larger size of the subset may cause a greater calculation amount involved in a subsequent process and may produce a better result of segmentation. A smaller size of the subset may cause a smaller calculation amount in the subsequent process and may result in a faster segmentation. In some embodiments, the size of the subset may be variable according to different conditions. Merely by way of example, a smaller size of the subset may be used during a rough segmentation process to rapidly identify the margin of a cardiac chamber, and a greater size of the subset may be used for a finer segmentation.

In 709, an average model may be generated based on the one or more control points. In some embodiments, the generation of the average model may be performed by the average model generation unit 608. A grid model corresponding to an average cardiac model may be formed. The grid model may be formed by a plurality of points and lines that connect at least part of the plurality of points. A plurality of grid models may be processed to generate the average grid model based on an image deformation model. The image deformation model may include a Point Distribution Model (PDM), an Active Shape Model (ASM), an Active Contour Model (also referred to as "Snakes"), an Active Appearance Model (AAM), or the like, or any combination thereof. In some embodiments, at least part of the control point(s) may be connected to form a net structure having a plurality of grids. The net structure may be further processed to generate the average model. For example, the control points may be connected to form a net structure having a plurality of triangular grids. The average model may be generated by an ASM based on the triangle grids. In some embodiments, the control point(s) may be adjusted based on a two-dimensional matrix of correlation factors. For example, when using an ASM, the control points may be adjusted based on a weighted average algorithm $\Sigma(Fi*Wi)$, where Fi denotes a deformation parameter of a cardiac chamber, Wi denotes a parameter related to a correlation factor.

Figure 8:
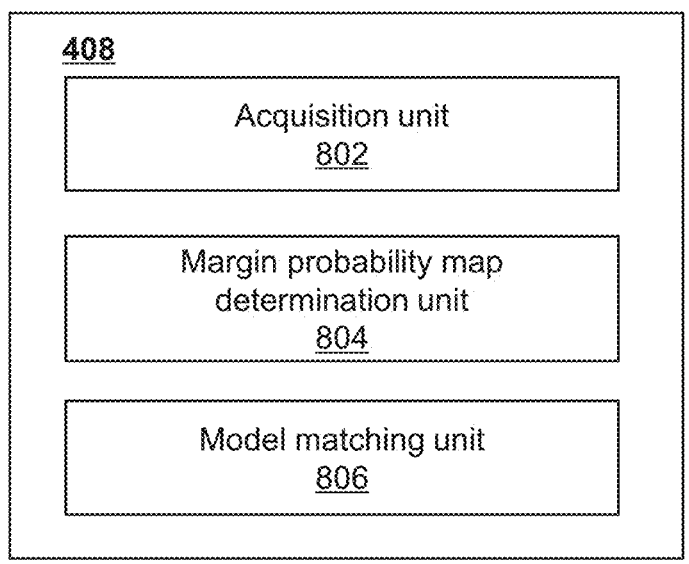
FIG. 8 is a block diagram illustrating an exemplary matching module according to some embodiments of the present disclosure.

FIG. 8 is a block diagram illustrating an exemplary matching module according to some embodiments of the present disclosure. The matching module 408 may include an acquisition unit 802, a margin probability map determination unit 804, and a model matching unit 806. At least a portion of the matching module 408 may be implemented in the computing device 200 illustrated in FIG. 2 (e.g., the processor 220) or the mobile device 300 illustrated in FIG. 3 (e.g., CPU 340).

The acquisition unit 802 may acquire an image and/or a model. The image may include a cardiac image. The model may include a cardiac model (e.g., an average cardiac model). In some embodiments, the acquisition unit 802 may acquire parameters for matching an image and a model. For example, the acquisition unit 802 may acquire an algorithm or parameters related to the algorithm used in matching the image and the model.

The margin probability map determination unit 804 may determine a margin probability map of the image. A margin probability of a point may refer to a probability that the point belongs to a margin. The margin probability of a point may have a value ranging from 0 to 1. The margin probability map may refer to a map that reflects the margin probabilities of a plurality of points in the image. In some embodiments, a point with a margin probability no less than a threshold in the image may be determined to be a first margin point of the image. A plurality of the first margin points may form a first margin (e.g., the margin that forms the outline of a heart) of the image. In some embodiments, the margin probability map may be determined based on a classifier that determines the margin probability of a point. The margin probability map may include a grayscale map, a colorful map (e.g., as illustrated in FIG. 24). The classifier may include a trained classifier that is trained based on a plurality of points. More descriptions regarding the classifier may be found elsewhere in the present disclosure (e.g., FIG. 16 and the descriptions thereof).

The model matching unit 806 may match a model with an image. In some embodiments, the model matching unit 806 may match the model with the image based on Hough transformation. In some embodiments, the model matching unit 806 may determine a centroid of the image based on the margin probability map of the image, and determine parameters of Hough transformation based on a transformation from the coordinate of the centroid of the model to the coordinate of the centroid of the image. The parameters of Hough transformation may include a rotation angle, a scale ratio, or the like, or any combination thereof. In some embodiments, the model matching unit 806 may transform the coordinate of each point of the model based on the parameters of Hough transformation.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, two or more units in the matching model 406 may be integrated into a single unit. However, those variations and modifications do not depart the scope of the present disclosure.

Figure 9:
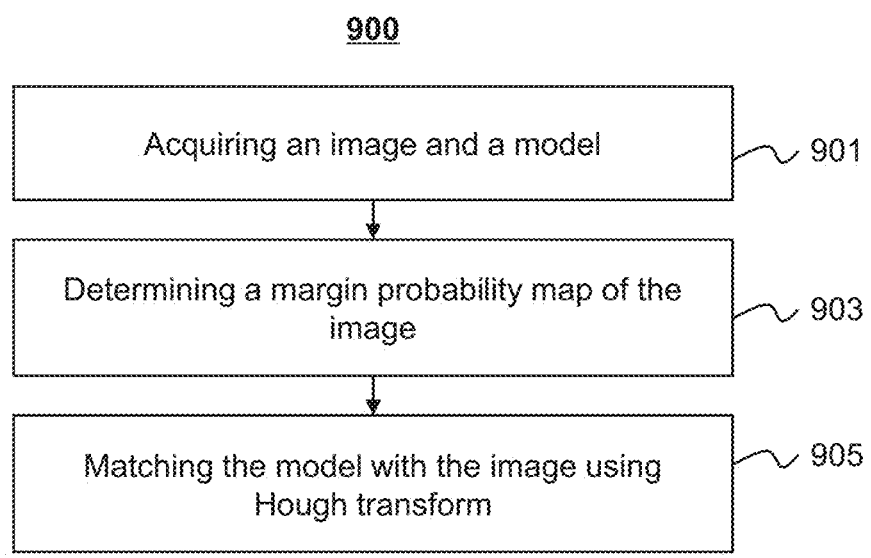
FIG. 9 is a flowchart of an exemplary process for matching a model with an image according to some embodiments of the present disclosure.

FIG. 9 is a flowchart illustrating an exemplary process for matching a model to an image according to some embodiments of the present disclosure. In some embodiments, the process 900 may be performed by the matching module 408. At least a portion of the process 900 may be implemented a in the computing device 200 illustrated in FIG. 2 (e.g., the processor 220) or the mobile device 300 illustrated in FIG. 3 (e.g., CPU 340). In some embodiments, the operation 507 of the process 500 may be performed according to the process 900.

In 901, an image and a model may be acquired. In some embodiments, both the image and the model may be acquired by the acquisition unit 802. In some embodiments, the image may include an image including one or more cardiac chambers. The model may include a cardiac model (e.g., an average cardiac model as described elsewhere in the disclosure). In 903, a margin probability map of the image may be determined. In some embodiments, the margin probability map may be determined by the margin probability map determination unit 804. The margin probability of a point may have a value ranging from 0 to 1. The margin probability map may refer to a map that reflects the margin probabilities of a plurality of points in the image. In some embodiments, a point with a margin probability that is equal to or greater than a threshold in the image may be determined to be a first margin point of the image. The threshold may be determined to be any value that ranges from 0 to 1. For example, the threshold may be 0.3, or 0.5, or 0.8. A plurality of the first margin points may form a first margin (e.g., the margin that forms the outline of a heart) of the image. In some embodiments, the margin probability map may be determined based on a classifier that determines the margin probability of a point. The margin probability map may include a grayscale map (e.g., the map illustrated in FIG. 24), a color map. The classifier may include a trained classifier that is trained based on a plurality of points. More descriptions regarding the classifier may be found elsewhere in the present disclosure (e.g., FIG. 16 and the descriptions thereof).

In 905, the model may be matched with the image using Hough transformation. For illustration purposes, a Hough transformation that is used to match a cardiac image and an average cardiac model is described. The parameters related to the Hough transformation may be determined based on the average cardiac model and control points on one or more margins of the average cardiac model. For example, a centroid of the average cardiac model may be determined. An offset and a gradient direction relative to the centroid may be determined for each of the control points. An offset vector (also referred to as gradient vectors) corresponding to a control point in a gradient direction may be determined. Then, the average cardiac model may be adjusted based on the gradient vectors. In some embodiments, the average cardiac model and a gradient vector may be presented in an x-y-z coordinate system (also referred to as the Cartesian coordinate system). In some embodiments, the coordinates of the gradient vectors expressed in the x-y-z coordinate system may be transformed into coordinates in a polar coordinate system. For example, an angle formed by the x-axis and a projection of a gradient vector in the x-y plane may be determined as a first angle $\theta$. The first angle $\theta$ may range from $-180°$ to $180°$. An angle formed by the gradient vector and the x-y plane may be determined as a second angle $\varphi$. The second angle $\varphi$ may range from $-90°$ to $90°$.

In some embodiments, a discretization operation may be performed for the first angle $\theta$ and the second angle $\varphi$. An exemplary discretized result may be presented in Table 1 (also referred to herein as an R-table). The first column denotes the discretization of the first angle $\theta$ and the second angle $\varphi$. With a specific first angle $\theta$ and a specific second angle $\varphi$, a line may be determined. The second column denotes the gradient vectors of corresponding control points that are passed by the line. In some embodiments, the gradient vectors in the R-table may be scaled and/or rotated to obtain shapes in various sizes and/or various angles.

TABLE 1

| Second angle $\varphi$, first angle $\theta$ | Gradient vectors of corresponding control points |
| --- | --- |
| 0, 90 | (x0, y0, z0), (x3, y3, z3), ... |
| 0, 80 | (x2, y2, z2), (x5, y5, z5), ... |
| ... | ... |
| 10, 90 | (x4, y4, z4), (x6, y6, z6), ... |
| ... | ... |

In some embodiments, a centroid of the image may be determined based on the margin probability map of the image. Parameters of Hough transformation may also be determined based on a transformation from the coordinates of the centroid of the model to the coordinates of the centroid of the image. The parameters of Hough transformation may include a rotation angle, a scale ratio, or the like, or any combination thereof. In some embodiments, the coordinates of each point of the model may be transformed based on the parameters of Hough transformation. For example, a point of the model may be rotated based on the rotation angle and scale the distance between the point and a reference point (e.g., the centroid) of the model based on the scale ratio.

For illustration purposes, the parameters of Hough transformation may be determined as follows. A plurality of first margin points on a first margin may be determined based on the margin probability map. An angle $\theta$ and an angle $\varphi$ corresponding to a gradient direction of a first margin point may be determined, and an offset of the first margin point may be determined based an R-table as described in connection with FIG. 8. One or more margin reference points may be determined based on the first margin point and the offset. Then, a weighted accumulation may be performed for each of the one or more margin reference points. For a margin reference point, the weighted accumulation may be performed based on the number of votes for the margin reference point (once a margin reference point is identified by a first margin point via the R-table, the margin reference point gets a vote) and the margin probability that a first margin point corresponds to the margin reference point. The weighted accumulation may be an accumulation of probabilities of first margin points being corresponding to the same margin reference point. A margin reference point with the greatest accumulation value of probabilities may be determined as the centroid of the image. The model matching unit 806 may also determine the parameters of Hough transformation based on a transformation from the coordinates of the centroid of the model to the coordinates of the centroid of the image. In some embodiments, the parameters of Hough transformation may be determined based on the corresponding parameters of the centroid of the images in the R-table (e.g., the first angle $\theta$, the second angle $\varphi$, or the gradient vector). The parameters of Hough transformation may include a rotation angle, a scale ratio, or the like, or any combination thereof. In some embodiments, the weighted accumulation may be represented by the following formula:

$$S(\theta, \varphi, r) = \underset{j}{\mathrm{argmax}} \sum_{i} p_i \sigma, \qquad (1)$$

where i denotes an index of the first margin points, j denotes an index of the margin reference points, p denotes a margin probability of a first margin point, and σ denotes one of two values (e.g., 0 and 1). If an $i_{st}$ first margin point votes for a $j_{st}$ margin reference point, σ may have a value of 1, otherwise σ may have a value of 0.

In some embodiments, after the parameters of Hough transformation are determined, the model matching unit 806 may match the model with the image by transforming the coordinates of each point of the model based on the parameters of Hough transformation. For example, a point of the model may be rotated based on the rotation angle defined by the Hough transformation.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, operations 901 and 903 may be combined into one operation. However, those variations and modifications do not depart the scope of the present disclosure.

Figure 10:
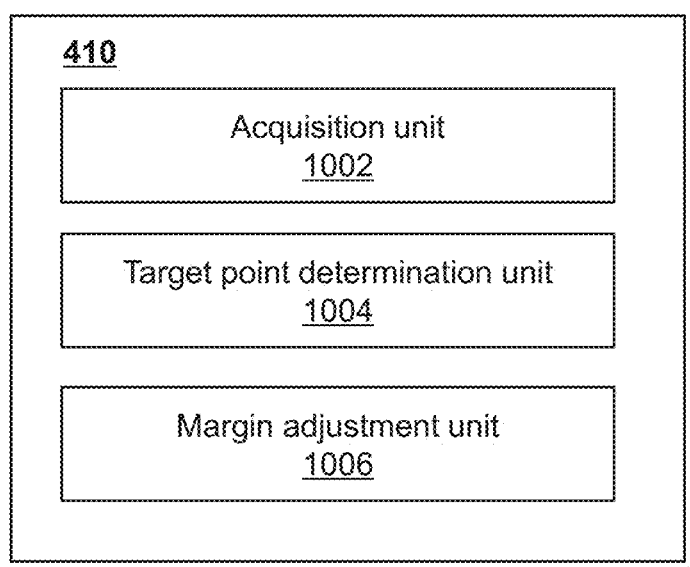
FIG. 10 is a block diagram illustrating an exemplary model adjustment module according to some embodiments of the present disclosure.

FIG. 10 is a block diagram illustrating an exemplary model adjustment module according to some embodiments of the present disclosure. The model adjustment module 410 may include an acquisition unit 1002, a target point determination unit 1004, and a margin adjustment unit 1006. At least a portion of the model adjustment module 410 may be implemented in the computing device 200 illustrated in FIG. 2 (e.g., the processor 220) or the mobile device 300 illustrated in FIG. 3 (e.g., CPU 340).

The acquisition unit 1002 may acquire a model relating to an ROI and a classifier. In some embodiments, the model may include a cardiac model, for example, the matched model described in connection with FIG. 9. The classifier may determine one or more third margin points of the model.

The target point determination unit 1004 may determine a target point corresponding to a third margin point of the model. A target point corresponding to a third margin point may reside within a certain range of the third margin point. In some embodiments, the target point may be determined based on a plurality of candidate points that are determined by a classifier.

The margin adjustment unit 1006 may adjust a third margin (also referred to as inner margin) of the model. The third margin of the model may be adjusted based on a third margin point and a target point determined by other components of the model adjustment module 410, for example, the target point determination unit 1004. For example, the margin adjustment unit 1006 may perform a transformation on the third margin point to adjust the third margin based on the target point. In some embodiments, the margin adjustment unit 1006 may adjust the third margin of the model for multiple times.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, two or more units in the model adjustment module 410 may be integrated into a single unit. However, those variations and modifications do not depart the scope of the present disclosure.

Figure 11:
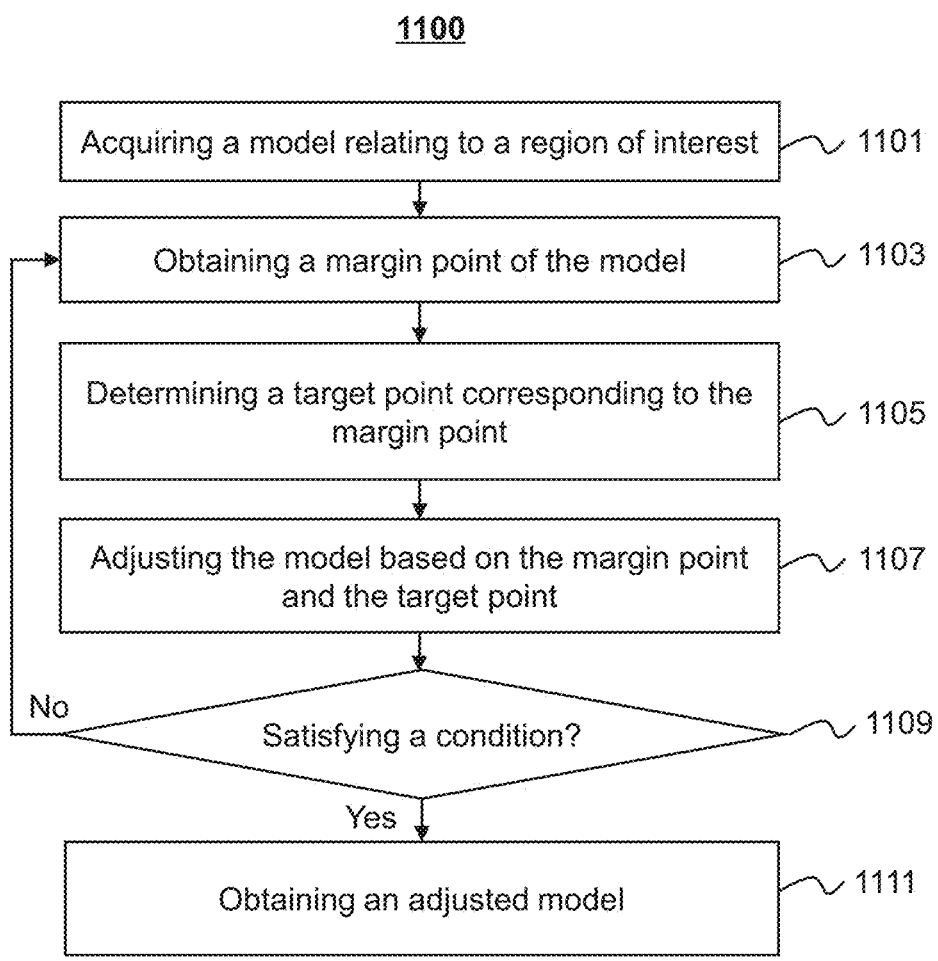
FIG. 11 is a flowchart of an exemplary process for adjusting a model according to some embodiments of the present disclosure.

FIG. 11 is a flowchart illustrating an exemplary process for adjusting a model according to some embodiments of the present disclosure. In some embodiments, the process 1100 may be performed by the model adjustment module 410. At least a portion of the process 1100 may be implemented in the computing device 200 illustrated in FIG. 2 (e.g., the processor 220) or the mobile device 300 illustrated in FIG. 3 (e.g., CPU 340). In some embodiments, the operation 509 of the process 500 may be performed according to the process 1100 for adjusting a matched model.

In 1101, a model relating to an ROI and a classifier may be acquired. In some embodiments, the model may be acquired by the acquisition unit 1002. In some embodiments, the model may include a matched model as described in connection with FIG. 9. The classifier may determine one or more third margin points of the model. As used herein, the third margin points may form a third margin (e.g., the inner margin that forms the outline of a cardiac chamber in the cardiac model) of the model. More descriptions regarding the classifier may be found elsewhere in the disclosure (e.g., FIG. 16 and the description thereof).

In 1103, a margin point of the model may be obtained. In some embodiments, the margin point may be obtained by the target point determination unit 1004. In some embodiments, the margin point may include a third margin point of a cardiac chamber in an average cardiac model as described elsewhere in the disclosure. The third margin point of the cardiac chamber may reside on a matched cardiac model.

In 1105, a target point corresponding to the margin point may be determined. In some embodiments, the target point may be determined by the target point determination unit 1004. The target point may reside within a range of the margin point. In some embodiments, the target point may be determined using a classifier. A plurality of candidate points within the range of the margin point may be determined. A probability that a candidate point is the target point may be determined based on the classifier. The classifier may be a trained classifier as described elsewhere in the disclosure (e.g., in connection with FIG. 16). Then, the target point may be determined according to the probabilities of the candidate points. More descriptions regarding the determination of the target point may be found elsewhere in the present disclosure (e.g., FIG. 12 and the description thereof).

In 1107, the model may be adjusted based on the margin point and the target point. In some embodiments, the model may be adjusted by the margin adjustment unit 1006. In some embodiments, the adjustment may include transforming the margin point to the target point via a transformation technique. Exemplary transformation techniques may include a similarity transformation, an affine transformation, or the like, or any combination thereof.

In 1109, a judgment of whether a condition is satisfied may be performed. The condition may include that the number of adjustments to the model are equal to or greater than a threshold. If the condition is satisfied, the process 1100 may proceed to 1111; otherwise, the process 1100 may go back to 1103 to process another margin point of the model. In some embodiments, the third margin of the model may be adjusted for multiple times. The target point used in each time may be the same or different. Specifically, if the number of adjustments is less than a threshold, the third margin of the model may be continued to be adjusted; otherwise, an adjusted model may be generated.

In 1111, an adjusted model may be obtained. In some embodiments, the adjusted model may be converted to an image to generate a specific image. The specific image may include a cardiac image with differentiated cardiac chambers (e.g., as illustrated in FIG. 26).

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the process 1100 may include one or more operations of training a classifier before the operation 1105, such that the target point corresponding to the margin point may be determined based on the trained classifier. The one or more operations of training a classifier may be found elsewhere in the disclosure (e.g., FIG. 16 and the description thereof). Thus the model may be adjusted only once. However, those variations and modifications do not depart the scope of the present disclosure.

Figure 12:
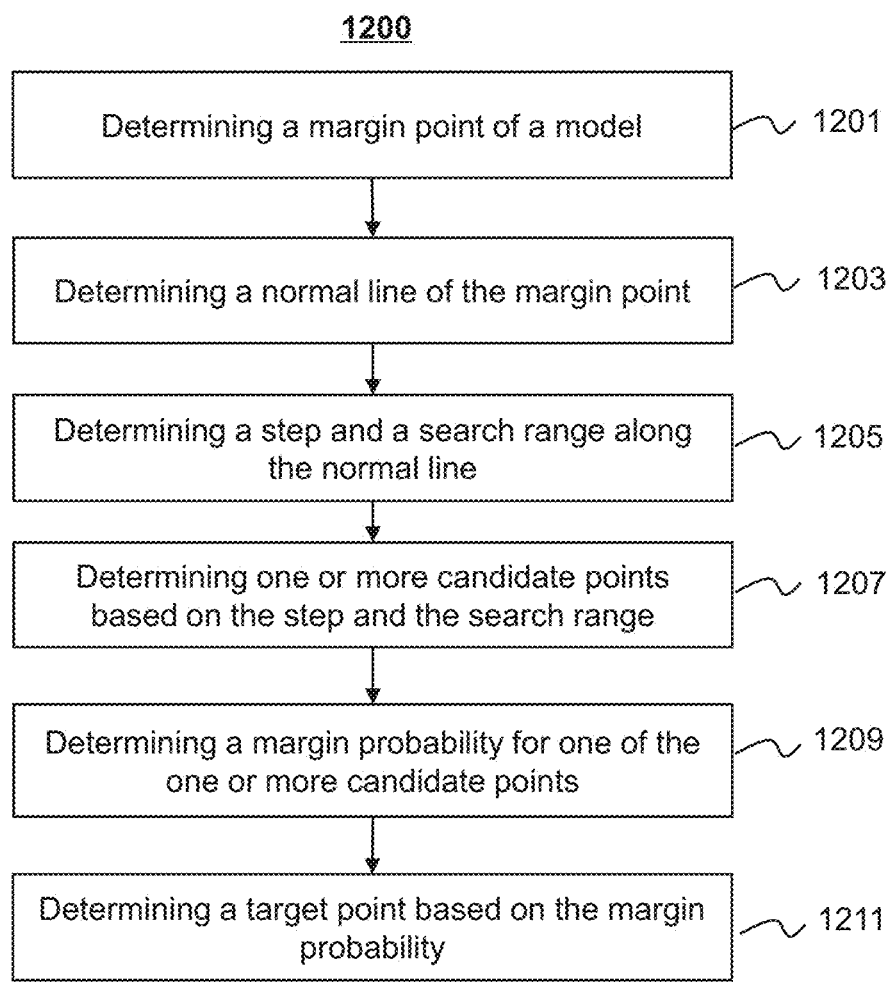
FIG. 12 is a flowchart of an exemplary process for determining a target point according to some embodiments of the present disclosure.

FIG. 12 is a flowchart illustrating an exemplary process for determining a target point according to some embodiments of the present disclosure. In some embodiments, the process 1200 may be performed by the target point determination unit 1004. At least a portion of the process 1200 may be implemented in the computing device 200 illustrated in FIG. 2 (e.g., the processor 220) or the mobile device 300 illustrated in FIG. 3 (e.g., CPU 340). In some embodiments, the operation 1105 of the process 1100 may be performed according to the process 1200.

In 1201, a margin point of a model may be determined. The margin point of the model may correspond to those described in operation 1103, and therefore the description thereof is not repeated herein.

In 1203, a normal line of the margin point may be determined. In some embodiments, the normal line may point from the interior of the model to the exterior of the model. More descriptions regarding the determination of the normal line may be found elsewhere in the present disclosure (e.g., FIG. 13 and the description thereof).

In 1205, a step and a search range along the normal line may be determined. The search range may refer to a range for searching a candidate point. For example, the search range may be a line segment starting from a margin point of the model along the direction and/or the opposite direction of the normal line (i.e., a direction from the interior to the exterior of the model and/or a direction from the exterior to the interior of the model). The length of the line segment may be equal to or less than a threshold. The step may refer to a unit distance for each search of a candidate point. In some embodiments, the step may be a portion of the search range. For example, the step may be 1/10 of the search range. Accordingly, the target point determination unit 1004 may perform ten times of searching the candidate point in the search range along the normal line.

In some embodiments, the value(s) of the step and/or the search range may be predetermined. For example, the value(s) of the step and/or the search range may be determined based on a user input. For example, the user may input the value(s) of the step and/or the search range into the processing device 130 through the I/O 260.

In 1207, one or more candidate points may be determined based on the step and the search range. For example, the search range may be set to be 10 cm, and the step may be set to be 1 cm. A margin point may have 21 candidate points in total. Among the 21 candidate points, 10 candidate points may reside on one side of the margin point along the direction of the normal line, 10 candidate points may reside on another side of the margin point along the opposite direction of the normal line, and 1 candidate point may be the margin point itself. Alternatively or additionally, the location(s) of the candidate point(s) may depend on the value of each step and the number of steps. For example, the value of the step may be set to be 0.5 cm, and the number of the steps may be set to be 3. A margin point may have 7 candidate points in total. Among the 7 candidate points, 6 candidate points may reside around the margin point, and the farthest candidate point is 1.5 cm far away from the margin point along the normal line.

In 1209, a margin probability may be determined for one of the one or more candidate points. The margin probability may refer to a probability that a candidate point belongs to a margin in an image corresponding to the model. In some embodiments, the margin probability may be determined by a classifier. The classifier may include a classifier that is trained based on a plurality of points within a certain range of the margin in the image. The certain range may be set automatically by the imaging system 100 or manually by a user.

In 1211, a target point may be determined based on the margin probability. In some embodiments, the target point may be determined based on the following formula:

$$F_i = \max(P_i - \lambda * d_i^2) \tag{2}$$

where $P_i$ denotes the margin probability of a candidate point, $d_i$ denotes a Euclidean distance between the candidate point and a margin point of the model, $\lambda$ denotes a weighting factor, which is a constant for balancing the Euclidean distance and the margin probability. It shall be noted that a candidate point that is closer to the margin point or has a higher margin probability may have a higher probability of being the target point.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, more than one target points corresponding to more than one margin points may be determined to adjust the model. However, those variations and modifications do not depart the scope of the present disclosure.

Figure 13:
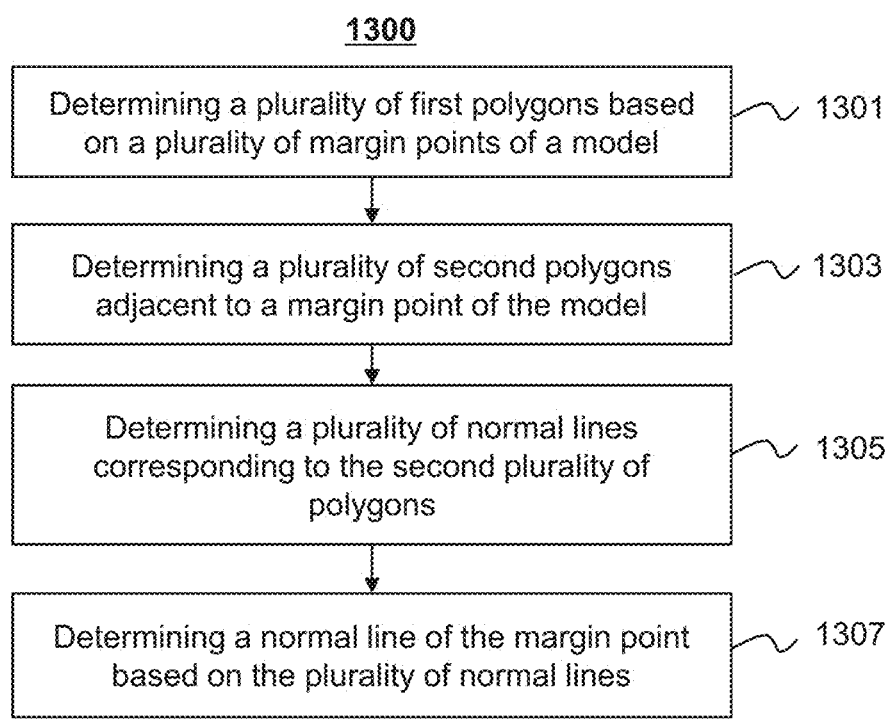
FIG. 13 is a flowchart of an exemplary process for determining a normal line of a margin point according to some embodiments of the present disclosure.

FIG. 13 is a flowchart illustrating an exemplary process for determining a normal line of a margin point according to some embodiments of the present disclosure. At least a portion of the process 1300 may be implemented in the computing device 200 illustrated in FIG. 2 (e.g., the processor 220) or the mobile device 300 illustrated in FIG. 3 (e.g., CPU 340). In some embodiments, the operation 1203 of the process 1200 may be performed according to the process 1300.

In 1301, a plurality of first polygons may be determined based on a plurality of margin points of a model (e.g., an average cardiac model). In some embodiments, the plurality of first polygons may be formed by connecting the plurality of margin points of the model. The plurality of first polygons may be of different shapes, for example, triangles, quadrangles. In some embodiments, the process of determining the plurality of first polygons based on the plurality of margin points may also be referred to as gridding. The plurality of first polygons may be referred to as grids, and the plurality of margin points may be referred to as nodes. It should be noted that the operation 1301 may be unnecessary. For example, a plurality of first polygons may have been formed during the generation of the model (e.g., an average model constructed as described in connection with FIG. 7); thus the operation 1301 may be omitted.

In 1303, a plurality of second polygons adjacent to a margin point of the model may be determined. The second polygons may be determined from the plurality of first polygons. The second polygons adjacent to the margin point may include one or more polygons that include the margin point. The second polygons may also include a polygon that can be connected to the margin point via a number of margin points, wherein the number of margin points may be no more than a threshold.

In 1305, a plurality of normal lines corresponding to the plurality of second polygons may be determined. In some embodiments, the plurality of normal lines corresponding to the plurality of second polygons may reside on the same side (the exterior of the model or the interior) of the model.

In 1307, a normal line of the margin point may be determined based on the plurality of normal lines. In some embodiments, the normal line of the margin point may be determined by adding up or averaging the plurality of unit vectors of the normal lines corresponding to the plurality of second polygons.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 14:
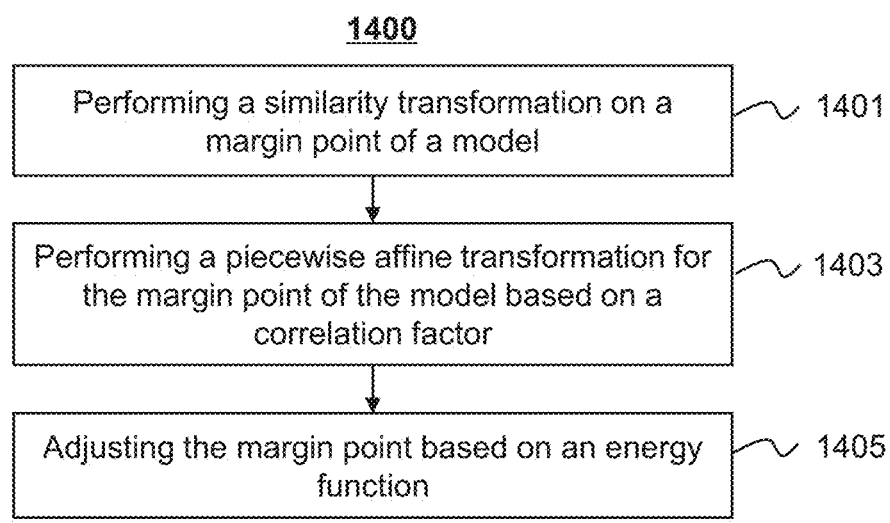
FIG. 14 is a flowchart of an exemplary process for adjusting a margin point of a model according to some embodiments of the present disclosure.

FIG. 14 is a flowchart illustrating an exemplary process for adjusting a margin point of a model according to some embodiments of the present disclosure. At least a portion of the process 1400 may be implemented in the computing device 200 illustrated in FIG. 2 (e.g., the processor 220) or the mobile device 300 illustrated in FIG. 3 (e.g., CPU 340). In some embodiments, the operation 1107 may be performed according to the process 1400.

In 1401, a similarity transformation may be performed on a margin point of a model. In some embodiments, the margin point may be transformed based on a target point corresponding to the margin point. The margin point may be shifted, rotated, or scaled up or down based on a direction from the margin point to the target point.

In 1403, a piecewise affine transformation may be performed on the margin point of the model. The piecewise affine transformation may include a plurality of affine transformations. An affine transformation may be performed on a portion of the model. The affine transformation may include a movement transformation and a shape transformation on a portion of the model.

In some embodiments, a margin point may correlate with more than one cardiac chambers. The effect generated by the more than one cardiac chambers on the margin point may be represented as a correlation factor. During an affine transformation, the correlation factor may be used as a weighting value of a transform parameter (e.g., a movement displacement, deformation proportion). The margin point of the model may be transformed based on the target point and the correlation factor.

In 1405, the margin point may be adjusted based on an energy function. In some embodiments, the energy function may be expressed as follows:

$$E = E_{ext} + \Sigma_c \alpha_c * E_{int}^c \quad (3),$$

where $E_{ext}$ denotes a function of external energy, which represents a relationship between a current point and a target point; $E_{int}$ denotes a function of internal energy, which represents a relationship between the current point and a margin point; α denotes a weigh for balancing the external energy and the internal energy, and different cardiac chamber is assigned with different weights; and c denotes a cardiac chamber. When the current point is closer to the target point and is also closer to a margin point, the energy function may have a lower value. A lower value of the energy function may indicate a more precise adjustment of the margin point. An optimum coordinate for adjusting the margin point may be obtained when the energy function reaches the minimum value. The function of external energy may be expressed as follows:

$$E_{ext} = \Sigma_i w_i \left( \frac{\nabla I(v_i^t)}{\|\nabla I(v_i^t)\|} * (v_i^t - v_i) \right)^2, \quad (4)$$

where i denotes a point; $w_i$ denotes a weight of a point (e.g., a reliability of the point); $v_i$ denotes the coordinate of a current point; $v_i^t$ denotes the coordinate of a point detected by a PBT classifier; $\nabla I(v_i^t)$ denotes a gradient (vector) of the current point; and $\|\nabla I(v_i^t)\|$ denotes a value of the gradient. The function of the internal energy may be expressed as follows:

$$E_{int} = \Sigma_i \Sigma_j \Sigma_k w_{i,k} ((v_i - v_j) - T_{affine,k}(m_i - m_j))^2 \quad (5),$$

where i denotes a point; j denotes a neighborhood of the point; $v_i - v_j$ denotes a side of a triangle at the current point; $w_{i,k}$ denotes a correlation factor (e.g., a factor of an effect generated by a chamber on the current point); $m_i$, $m_j$ denote two points of the model (e.g., obtained by PDM/ASM); $m_i - m_j$ denotes a side of a triangle of the model; $T_{affine,k}$ denotes a transformation relationship obtained by an affine transformation of a chamber k; and $v_i$ is a 3D coordinate.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the operation 1403 or the operation 1405 may be omitted. The adjustment of a margin point may be performed by a combination of the operation 1401 and the operation 1403, or a combination of the operation 1401 and the operation 1405. However, those variations and modifications do not depart the scope of the present disclosure.

Figure 15:
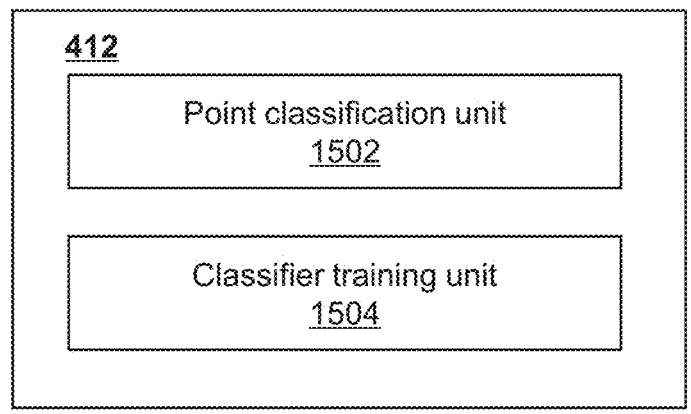
FIG. 15 is a block diagram illustrating an exemplary training module according to some embodiments of the present disclosure.

FIG. 15 is a block diagram illustrating an exemplary training module 412 according to some embodiments of the present disclosure. The training module 412 may include a point classification unit 1502 and a classifier training unit 1504. At least a portion of the training module 412 may be implemented in the computing device 200 illustrated in FIG. 2 (e.g., the processor 220) or the mobile device 300 illustrated in FIG. 3 (e.g., CPU 340).

The point classification unit 1502 may classify a plurality of points into two or more groups. In some embodiments, the plurality of points may be classified based on the sharpness and/or position information of the plurality of points.

Figure 23:
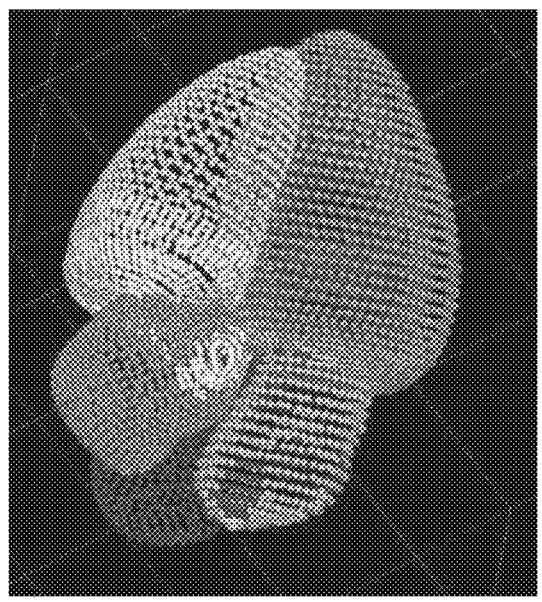
FIG. 23 is a schematic diagram illustrating classified points of a model according to some embodiments of the present disclosure.

The classifier training unit 1504 may train a classifier (e.g., the point classification unit 1502). The classifier training unit 1504 may train a preliminary classifier based on sample points that are divided into two or more categories (e.g., as illustrated in FIG. 23) to obtain a trained classifier. The two or more categories of sample points may include positive sample points and negative sample points. In some embodiments, the classifier training unit 1504 may train the preliminary classifier using a PBT (probabilistic boosting tree) algorithm. The trained classifier may determine a probability that a point belongs to a margin of a cardiac chamber based on a coordinate of the point. In some embodiments, the trained classifier may be stored in a storage device (e.g., the storage 120 of the imaging system 100) and retrieved by one or more components of the imaging system 100 for subsequent use.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, two or more units in the training module 412 may be integrated into a single unit. However, those variations and modifications do not depart the scope of the present disclosure.

Figure 16:
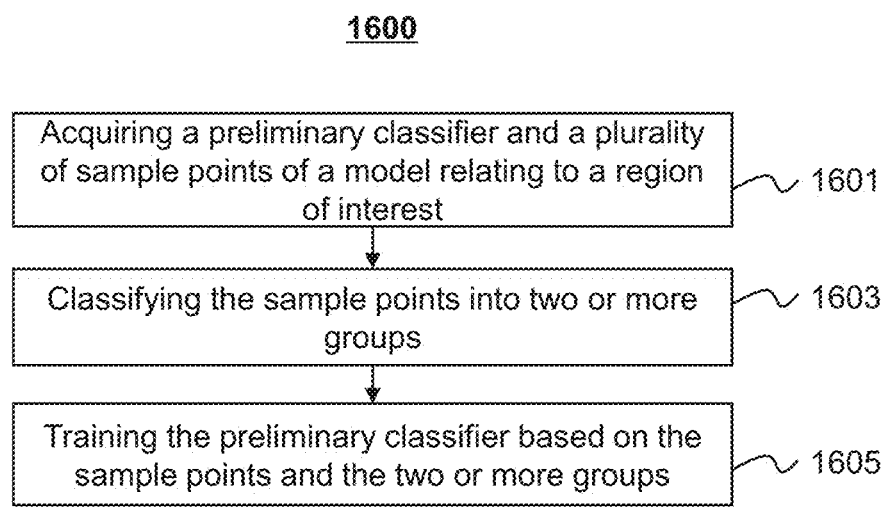
FIG. 16 is a flowchart of an exemplary process for training a classifier according to some embodiments of the present disclosure.

FIG. 16 is a flowchart illustrating an exemplary process for training a classifier according to some embodiments of the present disclosure. In some embodiments, the process 1600 may be performed by the training module 412. At least a portion of the process 1600 may be implemented in the computing device 200 illustrated in FIG. 2 (e.g., the processor 220) or the mobile device 300 illustrated in FIG. 3 (e.g., CPU 340).

In 1601, a preliminary classifier and a plurality of sample points of a model relating to an ROI may be acquired. The model may include a preliminary model or an average model as described in connection with FIG. 7. The plurality of sample points may include positive sample points. Alternatively or additionally, the plurality of sample points may include negative sample points. In some embodiments, a margin of a cardiac chamber in a cardiac model may be labeled, a plurality of first points residing within a certain range of the margin may be selected as positive sample points, and a plurality of second points residing outside the certain range may be selected as negative sample points. In some embodiments, the certain range of the margin may be a range limited by a distance, for example, 0, 0.1 cm, or 0.5 cm, or 1 cm, or 2 cm, from the margin. Specifically, the certain range may be 0; thus only margin points of the model may be selected as positive sample points.

In 1603, the sample points may be classified into two or more groups. In some embodiments, the plurality of points may be extracted from at least one cardiac model (e.g., an average cardiac model), and a group of sample points may correspond to a cardiac chamber of the cardiac model. In some embodiments, the sample points may be classified based on the sharpness and/or position information of the sample points. For example, each of the two or more groups may relate to, for example, a left ventricle margin, a left atrium sharp margin, a left atrium dull margin, a right ventricle sharp margin, a right ventricle dull margin, a right atrium sharp margin, a right atrium dull margin, an aorta margin, a left ventricular myocardium sharp margin and a left ventricular myocardium dull margin. The sample points may be classified using one or more algorithms. The one or more algorithms may include a decision tree classification algorithm, a Bayes classification algorithm, an Artificial Neural Network (ANN) classification algorithm, a k-Nearest Neighbor (KNN) algorithm, a Support Vector Machine (SVM) algorithm, a classification based on association rules, an ensemble learning classification algorithm, or the like, or any combination thereof. The decision tree classification algorithm may include an ID3 algorithm, a 04.5 algorithm, a 05.0 algorithm, a CART algorithm, a PUBLIC algorithm, an SLIQ algorithm, a SPRINT algorithm, or the like, or any combination thereof. The Bayes classification algorithm may include a naive Bayes algorithm, a tree augmented Bayes network (TAN) algorithm, or the like, or any combination thereof. The ANN classification algorithm may include a BP network, a Radical Basis Function (RBF) network, a Hopfield network, a dynamical neural network (e.g., a Boltzmann machine), a competitive neural network (e.g., a Hamming network, a self-organizing map network), or the like, or any combination thereof. The classification based on association rules may include CBA, ADT, CMAR, or the like, or any combination thereof. The ensemble learning classification algorithm may include Bagging, Boosting, AdpBoosting, PBT, or the like, or any combination thereof.

In 1605, the preliminary classifier may be trained based on the sample points and the two or more groups of the sample points. In some embodiments, the preliminary classifier may be trained using a PBT algorithm. The PBT algorithm may include a two-level PBT algorithm or a multi-level PBT algorithm. The trained classifier may identify margin points and non-margin points of other models or images. It should be noted that sample points of an image rather than a model may also be used to train a classifier. A classifier trained using sample points of a model as described above may be referred to as a first classifier. Similarly, a classifier trained using sample points of an image may be referred to as a second classifier.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the positive sample points and the negative sample point may both reside within a specific range of a margin of a chamber. In some embodiments, the specific range may be set to be 2 cm. However, those variations and modifications do not depart the scope of the present disclosure.

Figure 19:
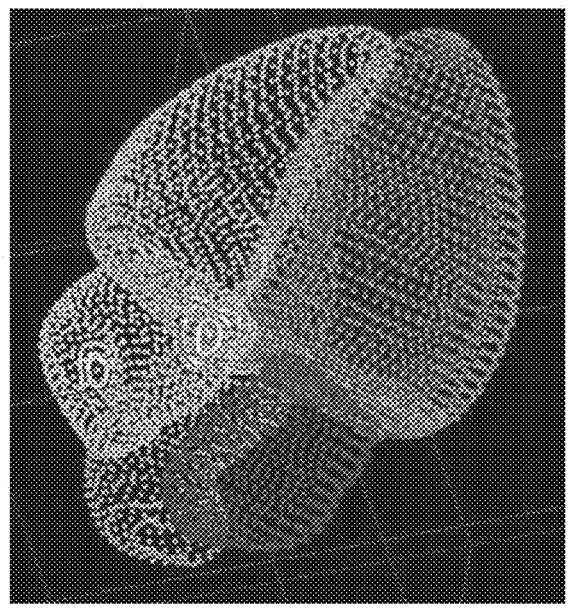
FIG. 19 is an exemplary grid model of an average model according to some embodiments of the present disclosure.
Figure 20:
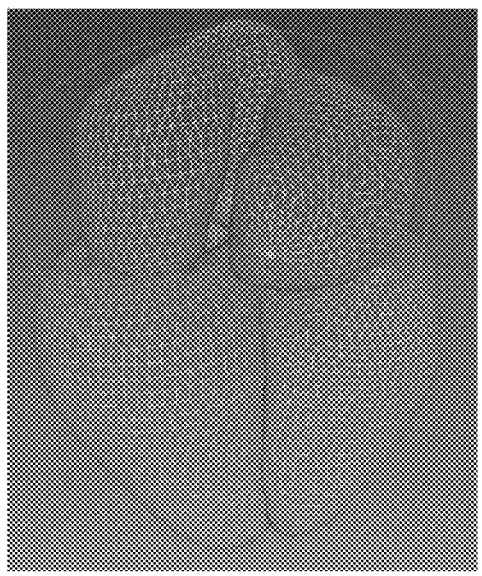
FIG. 20 is an exemplary grid model of an average model according to some embodiments of the present disclosure.
Figure 21:
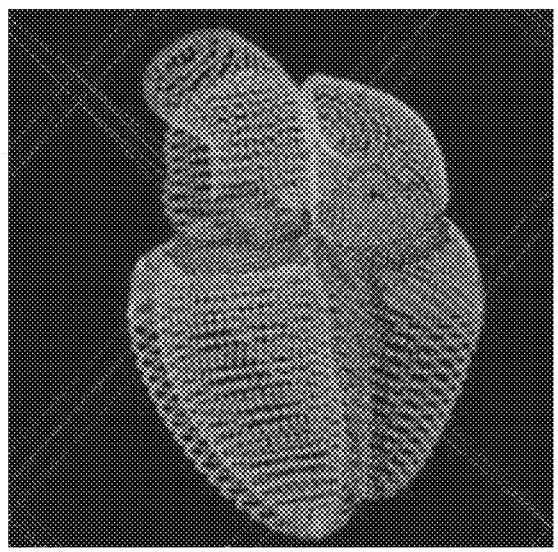
FIG. 21 is an exemplary grid model associated with correlation factors according to some embodiments of the present disclosure.
Figure 22:
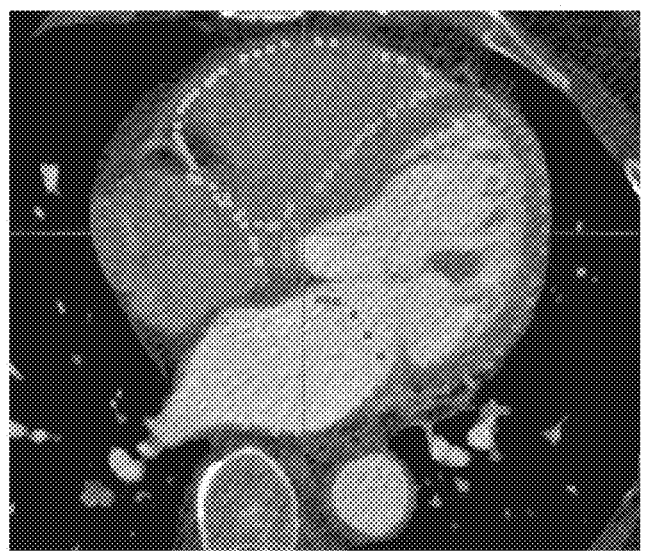
FIG. 22 is a schematic diagram illustrating margins classified based on sharpness according to some embodiments of the present disclosure.
Figure 25:
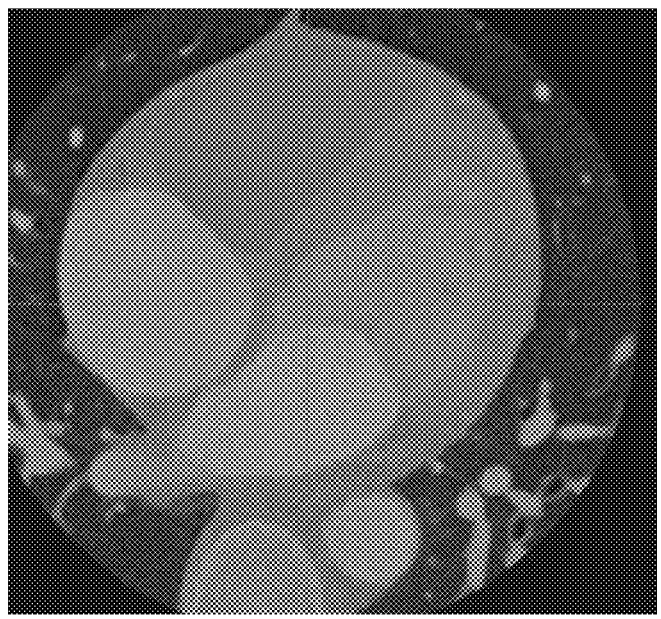
FIG. 25 is a schematic diagram illustrating a model matched with an image according to some embodiments of the present disclosure.
Figure 27A:
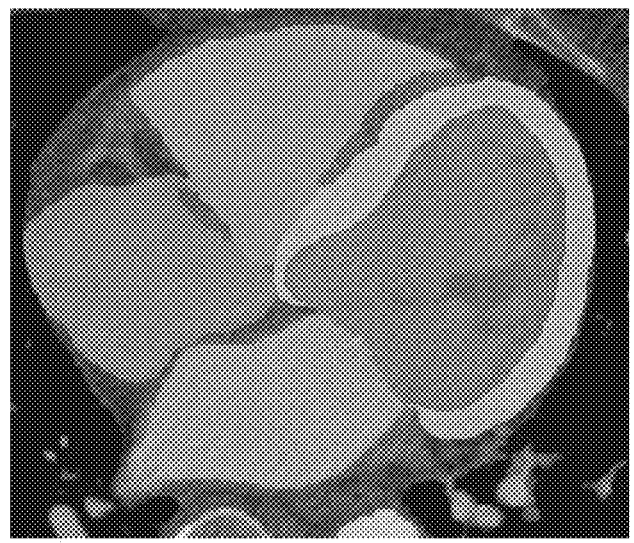
FIG. 27A is an exemplary segmented image without employing correlation factors according to some embodiments of the present disclosure.
Figure 27B:
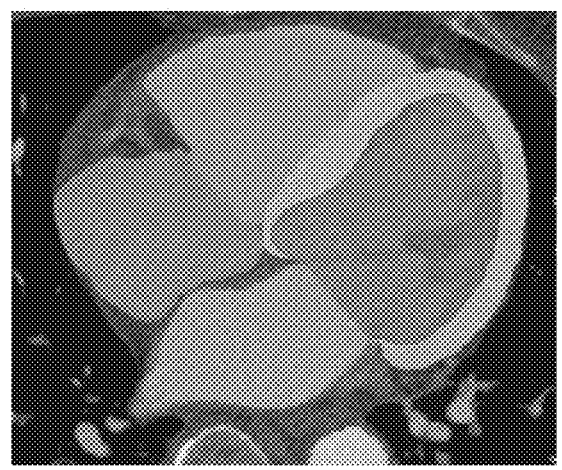
FIG. 27B is an exemplary segmented image based on correlation factors according to some embodiments of the present disclosure.

FIG. 17 is an exemplary image illustrating margin sharpness according to some embodiments of the present disclosure. FIG. 18 is an exemplary image illustrating classification of margins according to some embodiments of the present disclosure. FIG. 19 is an exemplary grid model of an average model according to some embodiments of the present disclosure. FIG. 20 is an exemplary grid model of an average model according to some embodiments of the present disclosure. FIG. 21 is an exemplary grid model associated with correlation factors according to some embodiments of the present disclosure. FIG. 22 is a schematic diagram illustrating margins classified based on sharpness according to some embodiments of the present disclosure. FIG. 23 is a schematic diagram illustrating classified points of a model according to some embodiments of the present disclosure. FIG. 24 is an exemplary probability map determined by a classifier according to some embodiments of the present disclosure. FIG. 25 is a schematic diagram illustrating a model matched with an image according to some embodiments of the present disclosure. FIG. 26 is a schematic diagram illustrating segmented chambers according to some embodiments of the present disclosure. FIG. 27A is an exemplary segmented image without employing correlation factors according to some embodiments of the present disclosure. FIG. 27B is an exemplary segmented image based on correlation factors according to some embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An image processing method implemented on at least one machine each of which has at least one processor and storage, the method comprising:
   acquiring, by the at least one processor, an image including a region of interest (ROI), the ROI having a first margin, the ROI including a subregion, the subregion having a second margin;
   acquiring, by the at least one processor, a first model according to the ROI, the first model having a third margin;
   determining by the at least one processor, based on the first margin and the third margin; a second model by matching the first model with the image, the second model including a sub-model, the sub-model having a fourth margin;
   determining by the at least one processor, based on the second margin, a third model by adjusting the fourth margin of the sub-model of the second model;
   segmenting, by the at least one processor, the ROI according to the third model; and
   generating, by the at least one processor, a segmented ROI based on a result of the segmentation.

2. The method of claim 1, wherein the acquiring the first model includes:
   acquiring at least one preliminary model corresponding to the ROI;
   determining one or more control points of the at least one preliminary model; and
   generating, based on the one or more control points, the first model.

3. The method of claim 2, wherein the generating, based on the one or more control points, the first model includes:
   determining a correlation factor based on a relationship between the one or more controls points and a fifth margin of the at least one preliminary model; and
   generating, based on the correlation factor and the one or more control points, the first model.

4. The method of claim 1, wherein the determining the third model includes:
   determining a margin point on the fourth margin;
   determining, based on the second margin, a target point corresponding to the margin point, the target point being within a range of the fourth margin; and
   adjusting the fourth margin based on the margin point and the target point.

5. The method of claim 4, wherein the determining the target point includes:
   determining, based on the margin point, a candidate point within the range of the fourth margin;
   determining, based on the second margin, a probability that the candidate point is the target point; and
   determining the target point based on the probability.

6. The method of claim 5, wherein the adjusting the fourth margin of the sub-model includes:
   determining, based on the target point, a transformed margin point by performing a similarity transformation on a margin point of the fourth margin; and
   adjusting the fourth margin of the sub-model by performing a piecewise-affine transformation on the transformed margin point based on a correlation factor, or by adjusting the transformed margin point based on an energy function.

7. The method of claim 5, wherein the determining the probability that the candidate point is the target point includes:
   obtaining a classifier; and
   determining the probability of the candidate point by the classifier.

8. The method of claim 7, wherein the classifier is generated according to a process for generating a classifier, the process comprising:
   obtaining a preliminary classifier;
   acquiring a plurality of sample points related to the ROI;
   classifying the plurality of sample points into two or more groups; and
   training the preliminary classifier to generate the classifier based on the sample points and the two or more groups.

9. The method of claim 8, wherein the classifying the plurality of sample points into the two or more groups includes:
   classifying the plurality of sample points into the two or more groups based on sharpness information or position information of the plurality of sample points.

10. The method of claim 8, wherein
    at least one group of the two or more groups of the sample points include a plurality of positive sample points and a plurality of negative sample points;
    the positive sample points reside on or within a range of a sixth margin of the ROI; and
    the negative sample points reside beyond a distance from the sixth margin of the ROI.

11. The method of claim 1, wherein the determining the second model by matching the first model with the image comprises:
    determining a margin probability map of the image; and
    matching the first model with the margin probability map.

12. The method of claim 11, wherein the matching the first model with the margin probability map is performed based on a Hough transformation.

13. An image processing system, comprising:
    at least one processor, and
    a storage configured to store instructions, the instructions, when executed by the at least one processor, causing the system to effectuate a method, the method comprising:
    acquiring an image including a region of interest (ROI), the ROI having a first margin, the ROI including a subregion, the subregion having a second margin;
    acquiring a first model according to the ROI, the first model having a third margin;
    determining, based on the first margin and the third margin, a second model by matching the first model with the image, the second model including a sub-model, the sub-model having a fourth margin;
determining, based on the second margin, a third model by adjusting the fourth margin of the sub-model of the second model;
segmenting the ROI according to the third model; and
generating a segmented ROI based on a result of the segmentation.

14. The system of claim 13, wherein the acquiring the first model includes:
acquiring at least one preliminary model corresponding to the ROI;
determining one or more control points of the at least one preliminary model; and
generating, based on the one or more control points, the first model.

15. The system of claim 14, wherein the generating, based on the one or more control points, the first model includes:
determining a correlation factor based on a relationship between the one or more controls points and a fifth margin of the at least one preliminary model; and
generating, based on the correlation factor and the one or more control points; the first model.

16. The system of claim 13, wherein the determining the third model includes:
determining a margin point on the fourth margin;
determining, based on the second margin, a target point corresponding to the margin point, the target point being within a range of the fourth margin; and
adjusting the fourth margin based on the margin point and the target point.

17. The system of claim 16, wherein the determining the target point includes:
determining, based on the margin point, a candidate point within the range of the fourth margin;
determining, based on the second margin, a probability that the candidate point is the target point; and
determining the target point based on the probability.

18. The system of claim 17, wherein the determining the probability that the candidate point is the target point includes:
obtaining a classifier; and
determining the probability of the candidate point by the classifier.

19. The system of claim 18, wherein the classifier is generated according to a process for generating a classifier, the process including:
obtaining a preliminary classifier;
acquiring a plurality of sample points related to the ROI;
classifying the plurality of sample points into two or more groups; and
training the preliminary classifier to generate the classifier based on the sample points and the two or more groups.

20. A non-transitory computer readable medium storing instructions, the instructions, when executed by at least one processor; causing the at least one processor to implement a method comprising:
acquiring an image including a region of interest ROI), the ROI having a first margin; the ROI including a subregion, the subregion having a second margin;
acquiring a first model according to the ROI, the first model having a third margin;
determining, based on the first margin and the third margin, a second model by matching the first model with the image, the second model including a sub-model, the sub-model having a fourth margin;
determining, based on the second margin, a third model by adjusting the fourth margin of the sub-model of the second model;
segmenting the ROI according to the third model; and
generating a segmented ROI based on a result of the segmentation.

* * * * *